United States Patent
Blackmore et al.

(10) Patent No.: US 7,813,369 B2
(45) Date of Patent: Oct. 12, 2010

(54) HALF RDMA AND HALF FIFO OPERATIONS

(75) Inventors: Robert S. Blackmore, Poughkeepsie, NY (US); Fu Chung Chang, Rhinebeck, NY (US); Piyush Chaudhary, Fishkill, NY (US); Kevin J. Gildea, Bloomington, NY (US); Jason E. Goscinski, Snoqualmie, WA (US); Rama K. Govindaraju, Hopewell Junction, NY (US); Donald G. Grice, Gardiner, NY (US); Leonard W. Helmer, Jr., Stone Ridge, NY (US); Patricia E. Heywood, Hopewell Junction, NY (US); Peter H. Hochschild, New York, NY (US); John S. Houston, Hopewell Junction, NY (US); Chulho Kim, Poughkeepsie, NY (US); Steven J. Martin, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 11/017,406

(22) Filed: Dec. 20, 2004

(65) Prior Publication Data

US 2006/0045108 A1 Mar. 2, 2006

Related U.S. Application Data

(60) Provisional application No. 60/605,659, filed on Aug. 30, 2004.

(51) Int. Cl.
G06F 13/14 (2006.01)

(52) U.S. Cl. .................... 370/429; 709/216; 709/219

(58) Field of Classification Search ................. 370/360, 370/386, 400, 401, 428, 429; 709/212–219
See application file for complete search history.

(56) References Cited

U.S. PATENT DOCUMENTS

| 6,272,518 | B1 | 8/2001 | Blazo et al. |
| 6,298,428 | B1 | 10/2001 | Munroe et al. |
| 6,594,701 | B1 * | 7/2003 | Forin .......................... 709/232 |
| 6,654,818 | B1 | 11/2003 | Thurber |
| 6,658,469 | B1 * | 12/2003 | Massa et al. ................. 709/224 |
| 6,721,806 | B2 | 4/2004 | Boyd et al. |
| 6,735,647 | B2 | 5/2004 | Boyd et al. |

(Continued)

*Primary Examiner*—Pankaj Kumar
*Assistant Examiner*—Duc T Duong
(74) *Attorney, Agent, or Firm*—Steven Chiu, Esq.; Kevin P. Radigan, Esq.; Heslin Rothenberg Farley & Mesiti P.C.

(57) ABSTRACT

In a multinode data processing system in which nodes exchange information over a network or through a switch, a structure and mechanism is provided within the realm of Remote Direct Memory Access (RDMA) operations in which DMA operations are present on one side of the transfer but not the other. On the side in which the transfer is not carried out in DMA fashion, transfer processing is carried out under program control; this is in contrast to the transfer on the DMA side which is characteristically carried out in hardware. Usage of these combination processes is useful in programming situations where RDMA is carried out to or from contiguous locations in memory on one side and where memory locations on the other side is noncontiguous. This split mode of transfer is provided both for read and for write operations.

23 Claims, 21 Drawing Sheets

U.S. PATENT DOCUMENTS

| | | |
|---|---|---|
| 6,748,499 B2 | 6/2004 | Beukema et al. |
| 6,804,673 B2 * | 10/2004 | Sugahara et al. ............... 707/10 |
| 6,813,653 B2 * | 11/2004 | Avery ........................... 710/22 |
| 6,947,970 B2 * | 9/2005 | Berry ........................... 709/212 |
| 7,149,819 B2 * | 12/2006 | Pettey ........................... 709/250 |
| 7,620,693 B1 * | 11/2009 | Mott et al. ................... 709/213 |
| 2002/0087720 A1 | 7/2002 | Davis et al. |
| 2002/0099879 A1 | 7/2002 | Bayer et al. |
| 2002/0152328 A1 | 10/2002 | Kagan et al. |
| 2003/0018787 A1 | 1/2003 | Neal et al. |
| 2003/0043805 A1 | 3/2003 | Graham et al. |
| 2003/0061379 A1 | 3/2003 | Craddock et al. |
| 2003/0061417 A1 | 3/2003 | Craddock et al. |
| 2003/0065775 A1 | 4/2003 | Aggarwal et al. |
| 2003/0195983 A1 | 10/2003 | Krause |
| 2004/0003141 A1 | 1/2004 | Matters et al. |
| 2004/0030806 A1 | 2/2004 | Pandya |
| 2004/0034718 A1 | 2/2004 | Goldenberg et al. |
| 2004/0049580 A1 | 3/2004 | Boyd et al. |
| 2004/0049600 A1 | 3/2004 | Boyd et al. |
| 2004/0049601 A1 | 3/2004 | Boyd et al. |
| 2004/0049603 A1 | 3/2004 | Boyd et al. |
| 2004/0202189 A1 | 10/2004 | Arndt et al. |

* cited by examiner

HALF RDMA AND HALF FIFO OPERATIONS

This application claims priority based upon Provisional patent application having Provisional Ser. No. 60/605,659 filed on Aug. 30, 2004.

BACKGROUND OF THE INVENTION

The present invention is generally directed to the transfer of information residing in one computer system or on one data processing node to another data processing node. The present invention is more particularly directed to data transfers in which data is transferred by the network adapter directly into the target user buffer in the address space of the receiving system or node from the address space of the sending system or node. This is referred to as remote direct memory access (RDMA). Even more particularly, the present invention is directed to systems and methods for carrying out RDMA without the automatic assumption that data which has been sent is data which has also been received. This assumption is referred to as reliable transport but which should really be thought of as the "reliable transport assumption." As used herein, the concept of reliable transport refers to a communication modality which is based upon a "send and forget" model for Upper Layer Protocols (ULPs) running on the data processing nodes themselves, as opposed to adapter operations. Correspondingly, the concept of unreliable transport refers to a communication modality which is not "send and forget" with respect to the ULP. Also, as used herein the term "datagram" refers to a message packet that is both self-contained as to content and essential heading descriptions and which is not guaranteed to arrive at any given time.

For a proper understanding of the contributions made to the data communication arts by the present invention it should be fully appreciated that the present invention is designed to operate not only in an environment which employs DMA data transfers, but that this data transfer occurs across a network, that is, remotely. Accordingly, the context of RDMA data transfer is an important aspect for understanding the operation and benefits of the present invention. In the RDMA environment, the programming model allows the end user or middleware user to issue a read or write command (or request) directed to specific virtual memory locations defined at both a sending node and at a remote data processing node. The node issuing the command is called (for the purposes of the RDMA transaction) the master node; the other node is referred to as the slave node. For purposes of better understanding the advantages offered by the present invention, it is noted here that the existing RDMA state of the art paradigm includes no functionality for referencing more than one remote node. It is also understood that the RDMA model assumes that there is no software in the host processor at the slave end of the transaction which operates to affect RDMA data transfers. There are no intermediate packet arrival interrupts, nor is there any opportunity for even notifying the master side that a certain portion of the RDMA data sent has now been received by the target. There is no mechanism in existing RDMA transport mechanisms to accept out-of-order packet delivery.

An example of the existing state of the art in RDMA technology is seen in the Infiniband architecture (also referred to as IB).

The state of the art RDMA paradigm also includes the limitation that data packets sent over the communications fabric are received in the same order as they were sent since they assume the underlying network transport to be reliable for RDMA to function correctly. This means that transmitted packets can easily accumulate in the sending side network communications adapters waiting for acknowledgment. This behavior has the tendency to create situations in which, at any given time, there are a large number of "packets in flight" that are buffered at the sending side network adapter waiting to be acknowledged. This tends to bog down adapter operation and produces its own form of bandwidth limiting effect in addition to the bandwidth limiting effect caused by the fact that the source and destination nodes are constrained by having all of the packets pass in order through a single communications path. In addition, adapter design itself is unnecessarily complicated since this paradigm requires the buffering of unacknowledged in-flight packets.

The DMA and RDMA environments are essentially hardware environments. This provides advantages but it also entails some risk and limitations. Since the RDMA function is provided in hardware, RDMA data transfers possess significant advantages in terms of data transfer rates and, as with any DMA operation, data transfer workload is offloaded from central processing units (CPUs) at both ends of the transfer. RDMA also helps reduce the load on the memory subsystem. Furthermore, the conventional RDMA model is based upon the assumption that data packets are received in the order that they are sent. Just as importantly, the "send and forget" RDMA model (RDMA with the underlying reliable network transport assumption) unnecessarily limits bandwidth and precludes the use of many other features and functions such as efficient striping multiple packets across a plurality of paths. These features also include data striping, broadcasting, multicasting, third party RDMA operations, conditional RDMA operations, half RDMA and half FIFO operations, safe and efficient failover operations, and "lazy" deregistration. None of these functions can be carried out as efficiently within the existing state of the art RDMA "send and forget" paradigm as they are herein.

The RDMA feature is also referred to in the art as "memory semantics" for communication across a cluster network, or as "hardware put/get" or as "remote read/write" or as "Remote Direct Memory Access (RDMA)."

It should also be understood that the typical environment in which the present invention is employed is one in which a plurality of data processing nodes communicate with one another through a switch, across a network, or through some other form of communication fabric. In the present description, these terms are used essentially synonymously since the only requirement imposed on these devices is the ability to transfer data from source to destination, as defined in a data packet passing through the switch. Additionally the typical environment for the operation of the present invention includes communication adapters coupled between the data processing nodes and the switch (network, fabric). It is also noted that while a node contains at least one central processing unit (CPU), it may contain a plurality of such units. In data processing systems in the pSeries line of products currently offered by the assignee of the present invention a node possibly contains up to thirty-two CPUs on Power4 based systems and up to sixty-four CPUs on Power5 based systems. (Power4 and Power5 are microprocessor systems offered by the assignee of the present invention). To ensure good balance between computational and communication capacity, nodes are typically equipped with one RDMA capable network adapter for every four CPUs. Each node, however, possesses its own address space. That is, no global shared memory is assumed to exist for access from across the entire cluster. This address space includes random access memory (RAM) and larger scale, but slower external direct access storage devices (DASD) typically deployed in the form of rotating magnetic disk media which works with the CPUs to provide a virtual address space in accordance with well known memory management principles. Other nonvolatile storage mechanisms such as tape are also typically employed in data processing systems as well.

The use of Direct Memory Address (DMA) technology provides an extremely useful mechanism for reducing CPU (processor) workload in the management of memory operations. Workload that would normally have to be processed by the CPU is handled instead by the DMA engine. However, the use of DMA technology has been limited by the need for tight hardware controls and coordination of memory operations. The tight coupling between memory operations and CPU operations poses some challenges, however, when the data processing system comprises a plurality of processing nodes that communicate with one another over a network. These challenges include the need for the sending side to have awareness of remote address spaces, multiple protection domains, locked down memory requirements (also called pinning), notification, striping and recovery models. The present invention is directed to a mechanism for reliable RDMA protocol over a possibly unreliable network transport model.

If one wishes to provide the ability to perform reliable RDMA transport operations over a possibly unreliable underlying network transport path, there are many important issues that should be addressed. For example, how does one accomplish efficient data striping over multiple network interfaces available on a node by using RDMA? How does one provide an efficient notification mechanism on either end (master and slave) regarding the completion of RDMA operations? How would one define an RDMA interface that lends itself to efficient implementation? How does one design a recovery model for RDMA operations (in the event when a single network interface exists and in the event when multiple network interfaces exist)? How does one implement an efficient third party transfer model using RDMA for DLMs (Distributed Lock Managers) and other parallel subsystems? How does one implement an efficient resource management model for RDMA resources? How does one design a lazy deregistration model for efficient implementation of the management of the registered memory for RDMA? The answers to these questions and to other related problems, that should be addressed as part of a complete, overall RDMA model, are presented herein.

As pointed out above, prior art RDMA models (such as Infiniband referred to above) do not tolerate receipt of packets in other than their order of transmission. In such systems, an RDMA message containing data written to or read from one node to another node is segmented into multiple packets and transmitted across a network between the two nodes. The size of data blocks which are being transferred, together with the packet size supported by the network or fabric, are the driving force for the partitioning of the data into multiple packets. In short, the need to transmit multiple packets as the result of a single read or write request is important given the constraints and state of the art of existing communication network fabrics. Furthermore, at another level, it is advantageous in the method of the present invention to divide the transfer into several independent multi-packet segments to enable striping across multiple paths in the communication fabric. At the node receiving the message (the receiving node), the packets are then placed in a buffer in the order received and the data payload is extracted from the packets and is assembled directly into the memory of the receiving node. The existing state of the art mechanisms are built on the assumption that the receipt of packets occurs in the same order in which they were transmitted. If this assumption is not true, then the communication transport protocols could mistake the earlier arriving packets as being the earlier transmitted packets, even though earlier arriving packets might actually have been transmitted relatively late in the cycle. If a packet was received in a different order than it was transmitted, serious data integrity problems could result. This occurs, for example, if a packet containing data that is intended to be written to a higher range of addresses of a memory, is received prior to another packet containing data that is intended to be written to a lower range of addresses. If the reversed order of delivery went undetected, the data intended for the higher range of addresses could be written to the lower range of addresses, and vice versa, as well. In addition, in existing RDMA schemes, a packet belonging to a current more recently initiated operation could be mistaken for one belonging to an earlier operation that is about to finish.

Accordingly, prior art RDMA schemes focused on enhancing network transport function to guarantee reliable delivery of packets across the network. With reliable datagram and reliably connected transport mechanisms such as this, the packets of a message are assured of arriving in the same order in which they are transmitted, thus avoiding the serious data integrity problems which could otherwise result. The present invention provides a method to overcome this dependence on reliable transport and on the in-order delivery of packets requirements and is implemented over an unreliable datagram network transport.

The prior art "reliably connected and reliable datagram" RDMA model also has many other drawbacks. Transport of message packets or "datagram" between the sending and receiving nodes is limited to a single communication path over the network that is selected prior to beginning data transmission from one node to the other. In addition, the reliable delivery model requires that no more than a few packets (equal to the buffering capability on the sending side network adapter) be outstanding at any one time. Thus, in order to prevent packets from being received out of transmission order, transactions in existing RDMA technologies have to be assigned small time-out values, so that a time-out is forced to occur unless the expected action (namely, the receipt of an acknowledgment of the packet from the receiver to the sender) occurs within an undesirably short period of time. All of these restrictions impact the effective bandwidth that is apparent to a node for the transmission of RDMA messages across the network. The present invention provides solutions to all of these problems.

SUMMARY OF THE INVENTION

In accordance with a preferred embodiment of the present invention a mechanism is provided for the transfer of data from the memory space of one data processing node to the memory space of one or more other data processing nodes. In particular, the present invention provides a data transfer structure and mechanism in which the data is transferred in at least one and typically in many packets which are not constrained to arrive at the destination node in any given order. The presence of the potentially out-of-order aspect provides the ability to structure a number of other transfer modalities and to provide a number of ancillary advantages all of which are described below under their respective headings.

In a first example of these additional data transfer modalities, it is possible to provide transfer modalities which are not processed symmetrically on both sides of the transfer. For example, one side may operate in a standard mode where data is transferred out of a FIFO queue while the other side operates in a remote DMA fashion.

In accordance with this first example there is provided a method for performing a write operation from a source node to a destination node, said method comprising the steps of: transferring said data via a DMA operation from said source node to a first communications adapter, coupled to said source node; transferring said data via a network from said first communications adapter to a second communications adapter coupled to said destination node; and transferring said data into a storage queue in said destination node wherein said data is subject to subsequent transfer to specific target memory locations within said destination node under program control in said second node.

In further accordance with this first example there is provided a method for performing a write operation from a source node to a destination node, said method comprising the steps of: transferring said data into a storage queue in said source node wherein said data is subject to subsequent transfer to a first communications adapter coupled to said source node under program control in said source node; transferring said data via a network from said first communications adapter to a second communications adapter coupled to said destination node; and transferring said data via a DMA operation from said second communications adapter to specific target memory locations within said destination node.

In accordance with this first example there is provided a method for performing a read operation initiated by a destination node for data residing on a source node, said method comprising the steps of: transferring said data via a DMA operation from said source node to a first communications adapter, coupled to said source node; transferring said data via a network from said first communications adapter to a second communications adapter coupled to said destination node; and transferring said data into a storage queue in said destination node wherein said data is subject to subsequent transfer to specific target memory locations within said destination node under program control in said second node.

In still further accordance with this first example there is provided a method for performing a read operation initiated by a destination node for data residing on a source node, said method comprising the steps of: transferring said data into a storage queue in said source node wherein said data is subject to subsequent transfer to a first communications adapter coupled to said source node under program control in said source node; transferring said data via a network from said first communications adapter to a second communications adapter coupled to said destination node; and transferring said data via a DMA operation from said second communications adapter to specific target memory locations within said destination node.

In a second example of the additional transfer modalities provided, it is noted that insensitivity to out-of-order data arrival makes it possible to transfer multiple data packets over a multiplicity of paths thus rendering it possible to engage in the rapid transfer of data over parallel paths.

In accordance with this second example there is provided method for data transport from a source node to at least one destination node, said method comprising the step of: transferring said data, in the form of a plurality of packets, from said source node to said at least one destination node wherein said transfer is via remote direct memory access from specific locations within said source memory to specific target locations within destination node memory locations and wherein said packets traverse multiple paths from said source node to said destination node.

In a third example out-of-order DMA transfers render it possible to provide RDMA operations in which initiation and control of the transfer is provided by a third party data processing node which is neither the data source nor the data sink. Another feature provided by the underlying structure herein is the ability to transfer data from a source node to a plurality of other nodes in either a broadcast or multicast fashion. Yet another feature along these same lines is the ability to condition the transfer of data on the occurrence of subsequent events.

In accordance with a broadcast example there is provided a method for data transport, in a network of at least three data processing nodes, from a source node to multiple destination nodes, said method comprising the step of: transferring said data from said source node to a plurality of destination nodes wherein said transfer is via remote direct memory access operation from specific locations within source node memory to specific target locations within destination node memory locations.

In accordance with a multicast example there is provided a method for data transport, in a network of at least three data processing nodes, from a source node to multiple destination nodes, said method comprising the step of: transferring said data from said source node to preselected ones of a plurality of destination nodes wherein said transfer is via remote direct memory access operation from specific locations within source node memory to specific target locations within destination node memory locations.

In accordance with a third party transfer example there is provided a method for data transport, in a network of at least three data processing nodes, from a source node to at least one destination node, said method comprising the step of: transferring said data from said source node to at least one destination node wherein said transfer is via remote direct memory access operation from specific locations within source node memory to specific target locations within destination memory locations and wherein said transfer is initiated at a node which is neither said source node nor said at least one destination node.

In accordance with a conditional transfer multicast example there is provided a method for data transport, in a network of at least three data processing nodes, from a source node to at least one destination node, said method comprising the step of: transferring said data from said source node to at least one destination node wherein said transfer is via remote direct memory access operation from specific locations within said source node memory to specific target locations within destination node memory locations and wherein said transfer is conditioned upon one or more events occurring in either said source node or in said destination node.

In a fourth example, the structure of the remote DMA provided herein permits the earlier processing of interrupts thus allowing the CPU to operate more efficiently by focusing on other tasks.

In accordance with the fourth example embodiment there is provided a method for data transport from a source node to at least one destination node, said method comprising the steps of: transferring said data, in the form of a plurality of packets, from said source node to said at least one destination node wherein said transfer is via remote direct memory access from specific locations within said source memory to specific target locations within destination node memory locations and wherein said transfer path includes communication adapters coupled to said source and destination nodes and wherein said destination side adapter issues an interrupt indicating completion prior to transfer of data into said specific target locations within said destination node memory locations.

In a fifth example, a process and system provide a snapshot interface in RDMA Operations.

In a sixth example, a process and system are provided for dealing with failover mechanisms in RDMA Operations.

In a seventh example, a process and system are provided for structuring and handling RDMA server global TCE tables.

In an eighth example, process and system are provided for the interface Internet Protocol fragmentation of large broadcast packets.

In a ninth example, process and system are provided for "lazy" deregistration of user virtual Machine to adapter Protocol Virtual Offsets.

Accordingly, it is an object of the present invention to provide a model for RDMA in which the transfer of messages avoids CPU copies on the send and receive side and which reduces protocol processing overhead.

It is also an object of the present invention to permit jobs running on one node to use the maximum possible portion of the available physical memory for RDMA purposes.

It is a further object of the present invention to provide zero-copy replacement functionality.

It is a still further object of the present invention to provide RDMA functionality in those circumstances where it is particularly appropriate in terms of system resources and packet size.

It is a still further object of the present invention to allow users the ability to disable RDMA functionality through the use of job execution environment parameters.

It is another object of the present invention to keep the design for the adapter as simple as possible.

It is yet another object of the present invention to provide a mechanism in which almost all of the error handling functionality is outside the mainline performance critical path.

It is still another object of the present invention to provide a protocol which guarantees "at most once" delivery of an RDMA message.

It is yet another object of the present invention to minimize the performance and design impact on the other transport models that coexist with RDMA.

It is yet another object of the present invention to provide additional flexibility in the transfer of data packets within the RDMA paradigm.

It is still another object of the present invention to provide a mechanism for RDMA transfer of data packets in which packets are broadcast to a plurality of destinations.

It is also another object of the present invention to provide a mechanism for RDMA transfer of data packets in a multicast modality.

It is a further object of the present invention to provide a mechanism for third party transfer of data packets via RDMA.

It is a still further object of the present invention to provide a mechanism for the conditional transfer of data packets via RDMA.

It is a further object of the present invention to provide a mechanism in which it is possible to improve transmission bandwidth by taking advantage of the fact that the transport protocol now permits data packets to be transmitted across multiple paths at the same time.

It is another object of the present invention to provide efficient striping across multiple interfaces and failover mechanisms for use in RDMA data transfer operations.

It is yet another object of the present invention to provide improved optimistic methods for deallocating RDMA enabled memory resources following the end of a data transfer.

It is a still further object of the present invention to provide a mechanism for the transfer of data packets to receiving hardware without the need for software intervention or processing intermediate packet arrival interrupts on either the slave side or on the master side of the transaction.

Lastly, but not limited hereto, it is an object of the present invention to improve the flexibility, efficiency and speed of data packet transfers made directly from the memory address space of one data processing unit to the memory address space of one or more other data processing units.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing in which:

DETAILED DESCRIPTION OF THE INVENTION

Figure 1:
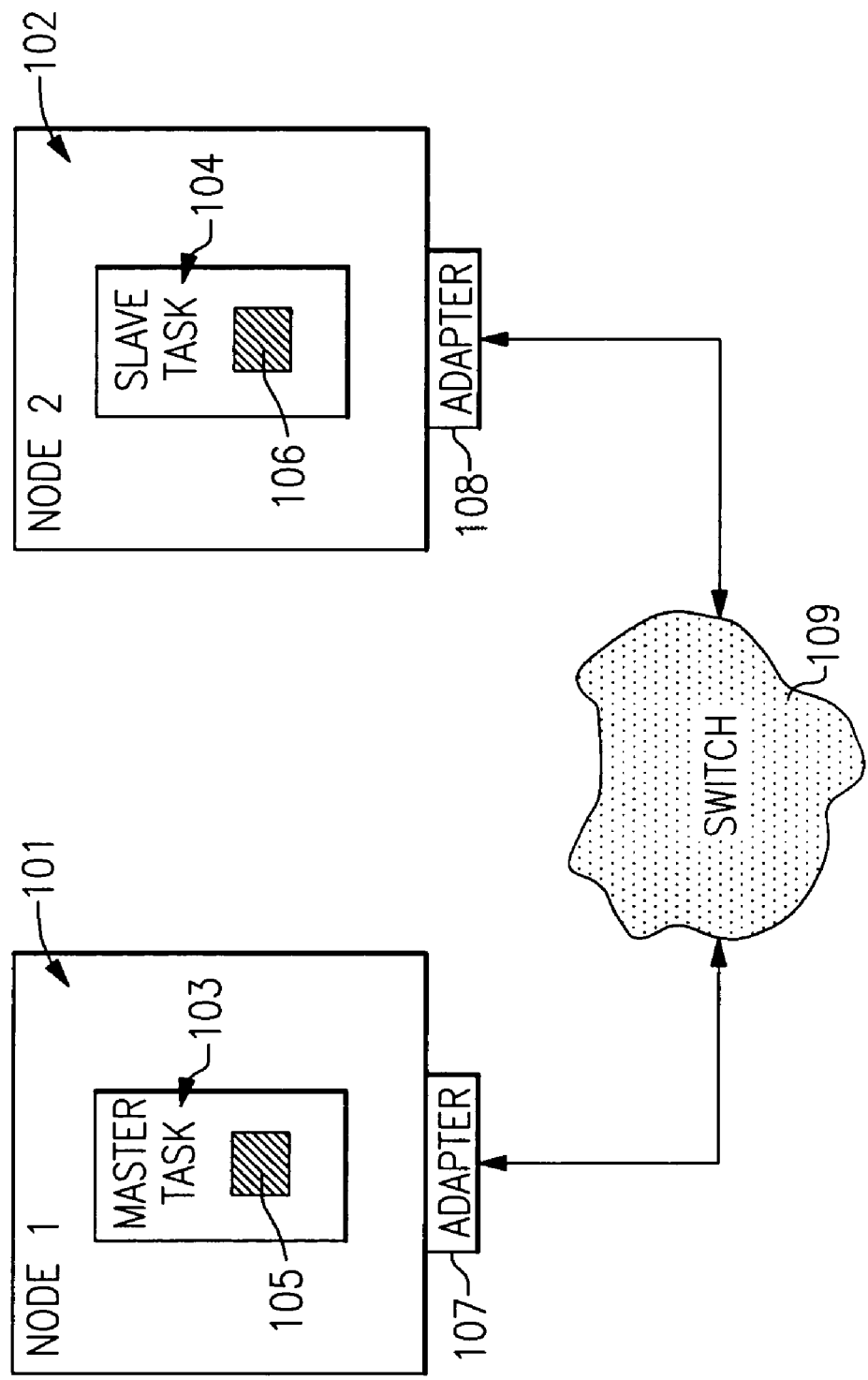
FIG. 1 is a block diagram illustrating the overall concept of Remote Direct Memory Access between nodes in a data processing system.

In order to provide a more understandable description of the structure and operation of the present invention, it is useful to first describe some of the components that exist in the environment in which the invention is typically embodied. This environment includes at least two data processing systems capable of Remote Direct Memory Addressing (RDMA) operations. Each data processing system communicates to any other coupled data processing system through a switch (also termed herein a network, fabric or communications fabric). The switches hook up to the nodes via a switch adapter. Each data processing system includes one or more nodes which in turn may include one or more independently operating Central Processing Units (CPUs). Each data processing system communicates with the switch by means of a switch adapter. These adapters, such as those present in the pSeries of products offered by the assignee of the present invention, include their own memory for storage and queuing operations. These switch adapters may also include their own microcode driven processing units for handling requests, commands and data that flow via the adapter through the network to corresponding communication adapters. The corresponding communication adapters are associated in the same way with other data processing systems and may have similar capabilities.

The Concept of a Window

An adapter window is an abstraction of a receive FIFO queue, a send FIFO queue and some set of adapter resources and state information that are mapped to a user process that is part of a parallel job. The FIFO queues are used for packet-mode messages, as well as for posting RDMA command and notification requests that help the ULP handshake with the adapter.

The Receive Side

Each receive side FIFO queue is a structure in the form of one or more large pages. An even easier alternative is to always deploy the FIFO queue as a 64 MB memory page. The memory for the Receive FIFO, regardless of its size, is expected to be in contiguous real memory, and the real memory address of the start of the table is stored in the Local Mapping Table (LMT) for the given adapter window in adapter SRAM. Having the receive FIFO queues mapped to contiguous real memory eliminates the need for the network adapter to have to deal with TCE (translation tables) tables and for the driver to have to set these tables up during job startup. The contiguous real memory hence simplifies the adapter design considerably because it does not need to worry about TCE caching and its management in the critical data transfer paths. Regardless of the FIFO size, in the preferred implementation herein, the queue is comprised of fixed length (2 KB) data packet frames which is dictated by the maximum packet size handled by the switch. The concepts explained herein naturally extend to other possible packet sizes.

Packet arrival notification for packet mode operation is accomplished as follows. The microcode DMAs all but the first cache line of an arriving packet to system memory. It waits for that data to reach the point of coherence, and then DMAs the first cache line (the so-called header) into the appropriate packet header slot in the packet buffer in system memory. The ULP polls on the first cache line of the next packet frame to determine if a new packet has arrived. Upon consuming the packet, the ULP zeroes out the first line (or a word thereof) of the packet, to prepare the fifo slot for its next use. This zeroing out by the ULP allows the ULP to easily distinguish new packets (which never have the line zeroed out) from older packets already consumed by the ULP. For RDMA mode, the FIFO entry that is put into the FIFO is an RDMA completion packet, which as a header only entity, so is transferred as a single cache line DMA.

This FIFO queue structure is simple and it minimizes short-packet latency. Short packets (that is data packets less than 128 bytes) suffer only one system memory latency hit, as opposed to other mechanisms involving a separate notification array or descriptor. The present mechanism also enhances compatibility with the send-side interface, and is readily amenable to other variations based on the use of hardware as opposed to software as a design component of the FIFO queue model.

When the receive-side FIFO queue is full, incoming packet mode packets and RDMA completion packets are silently discarded. Interrupts are based on the FIFO queue count threshold for the given adapter window. For example, an interrupt is generated when the microcode writes the n$^{th}$ receive FIFO entry, where n is an integer previously provided by the higher level protocol as the next 18 item of interest. Note that interrupts can be disabled by the user space ULP by setting the count to some selected special value such as zero or all ones. Interrupt signals are generated upon triggering conditions, as perceived by the adapter. Incoming packets are validated on the basis of the protection key stamped in the packet header.

In the present invention, packets are potentially delivered to the FIFO queue system memory in an out-of-order sequence (that is, it is possible for completions to be marked out of order). The FIFO queue tail pointer in the Local Mapping Table is incremented as each entry is written to the receive FIFO. Multiple receive threads engines on the adapter, even if acting on behalf of the same window, require no additional synchronization with respect to each other allowing for significant concurrency in receipt of a message. Packet frames are returned by the adapter to the ULP by means of an MMIO command (see below). The total number of adapter receive tasks is preferably limited to the minimum number that keeps all pipelines full. In the presently preferred embodiments of the present invention this number is four and can be tuned to different settings for improved performance.

The current and preferred implementation of the present adapter uses MMIO commands for a number of commands from the ULPs to the adapter microcode and/or hardware. The host code can access the registers and facilities of the adapter by reading or writing to specific addresses on the system bus. In the case of writes, depending upon the specific address, the data that is written can be either forwarded by the hardware interface to the microcode running on the adapter, or processed directly by the adapter hardware. When dealing with a command that is destined for the microcode, both the data written and the address used serve as input to the microcode to determine the exact operation requested. Among the operations utilized in the receive processing are:

a. Update Slot Counts command—This is used to return Receive FIFO slots to the adapter for reuse;
 b. Update Interrupt Threshold command—This is used to set a new mark to indicate when the adapter microcode should generate the next interrupt. Note that it is possible for this command to cause an immediate interrupt.

Adapter SRAM accesses are also achieved using Memory Mapped I/O (MMIO), but this is handled directly by the hardware without microcode support. The host side code may access, with proper authority which is setup during parallel job startup, the data stored in the adapter SRAM. This includes the LMTs for all of the windows and all of the RDMA Contexts (rCxt). Read LMT is an example of a specific device driver/hypervisor implemented command that uses the adapter SRAM access MMIO to retrieve data from adapter SRAM. It works by passing the specific address of where the LMT is stored, within SRAM, as a part of the Adapter SRAM access MMIO. It is important to point out though that the LMT stored in the SRAM may not always be current. In the preferred implementation, the working copy of the LMT is cached closer to the adapter processor for improved performance in the mainline data transfer path.

The adapter microcode performs a number of different operations related to processing packets received from the network or switch. Below is a brief overview of this process. The microcode executes steps either as the result of receiving a MMIO command, passed through by the hardware, or an incoming packet from the network. It is noted that in the preferred implementation herein, there is provided a microcode engine running on the adapter. Other implementations which do not use a microcode engine are possible (for example, a complete state machine, an FPGA based engine, etc.). The concepts explained in this preferred embodiment extend to other possible implementations as well. The steps involved in processing a packet received from the network or switch are now considered:

a. Task allocation—The hardware pre-allocates tasks to be used for received packets (this spawns a new thread of execution on the adapter).
 b. Packet header arrival (thread wakeup)—When the hardware starts to receive a packet header, it allocates the appropriate Channel Buffer (CB) (or window resources) based upon the adapter channel that this packet is destined for (information within the packet indicates this). The channel buffer is an array of memory in the adapter that is available to the microcode. This is where the LMTs (the window state) are cached for all adapter windows. By design there are as many channel buffers as there are tasks, and there is enough space within the channel buffers to store LMTs for all of the possible adapter windows. All tasks working on the same group of windows reference the same channel buffer. In addition to allocating the channel buffer, the hardware also copies the received packet header to task registers and schedules the task to be executed. The role of the microcode during this time is to validate the packet as something of interest and to prepare for the arrival of the payload (if any). The microcode then checks to determine whether or not the payload has arrived. If so, it proceeds directly to the next step. Otherwise, it suspends this task waiting for the payload to arrive. Such suspension allows for other activity to be overlapped with waiting for payload arrival, thus ensuring maximum concurrency in adapter operations.
 c. Packet data arrival—When the packet payload, if any, arrives, the hardware allocates a Data Transfer Buffer (DTB). The DTB is an array of memory in the adapter which is not directly accessible to the adapter processor. The DTB is a staging area for the packet payload in the adapter before it is pushed into system memory for the ULP or application to absorb into the ongoing computation. If adapter microcode had suspended processing awaiting the payload arrival, the task is then added to the dispatch queue by the hardware. Assuming that the packet is valid, the microcode initiates a data transfer of the payload to system memory (the Receive FIFO for FIFO mode). For the FIFO mode of operation, if the payload is greater than a single cache line, then only data following the first cache line is moved initially. (If the payload is less than or equal to a single cache line, then the entire payload is transferred at once.) For RDMA mode, the entire packet is transferred to system memory at one time. Once any data move has been started, the microcode suspends the task waiting for the data transfer to complete.
 d. When the hardware completes moving the data to system memory, the task is again awakened. In FIFO mode, if the payload is greater than a single cache line, then the first cache line is written to system memory. Writing this data after the rest of the data is already in system memory insures data coherence. As explained above the DMA-ing of the first cache line is a signal to the ULP that new data has arrived. The task again suspends after initiating this transfer.
 e. Once all data has been transferred to system memory, the task is again dispatched.

At this point it determines whether or not an interrupt is required. If so, then it initiates the interrupt process prior to releasing the CB and DTB buffers and deallocating the task.

It is noted that items c, d, and e in the list above are similar to items a and b, but that they can be driven by a different hardware event.

The Send Side

The real memory address of the transmit-side FIFO queue, like that of the receive side FIFO queue, is a contiguous section of real system memory whose real address is stored in the LMT for the adapter window. This queue also employs fixed length packet frames. In presently preferred embodiments of the present invention, each packet is up to 16 cache lines long. The destination node id (that is, the id for the destination node adapter), the actual length of the data in the packet, and the destination window are specified in a 16-byte header field (in the presently preferred embodiment) within the first cache line. The header is formatted so as to minimize the amount of shuffling required by the microcode. Note that the destination node id need not be checked by microcode; this protection is provided by the above-mentioned protection key.

For each outgoing packet, the adapter fetches the packet header into the Header Buffer (an array of memory in the memory of the adapter; there are 16 of these header buffers in the presently preferred embodiment). The microcode then modifies the packet header to prepare it for injecting the packet into the network, including adding the protection key associated with this adapter window from the LMT. The adapter also fetches the data payload from the send FIFO queue (for FIFO mode) or from the identified system memory for RDMA, into the Data Transfer Buffer, via local DMA (system memory into adapter). Once the header is prepared and the payload is in the DTB, the adapter can inject the packet into the network.

After transmitting the packet, the adapter marks completion by updating the header cache line of the frame in the send FIFO queue. This is done for every packet that the microcode processes so that the ULP can clearly see which packets have or have not been processed by the adapter.

This completion marking of the send FIFO queue entry is performed using a sync-and-reschedule DMA operation in the presently preferred embodiment. When this DMA operation completes, the task is ready to process a new send request.

The adapter maintains a bit vector of active adapter windows (hence the number of adapter windows is restricted). The bit vector is contained in either one of two global adapter registers. A bit is set by a system MMIO StartTransmit command; the command also includes a packet count which is added to the readyToSend packet count in the LMT. Each time a packet is processed, readyToSend is decremented. The ready bit is cleared when the adapter processes the last readyToSend packet.

Transmit threads proceed through the active adapter windows in a round robin fashion. We switch windows every k packets, even when k=1. Some efficiency (for example, fewer LMT fetches) is gained for k>1, for instance by reusing the register state. But that tends to optimizes the send side better than the receive side (which helps exchange bandwidth, but may cause congestion to increase). The actual selection of the value of k can be tuned based on the requirements for performance, fairness among all windows, and other policy controls selectable by the user or system administrator.

The total number of transmit tasks is limited to the minimum that keeps all pipes flowing (Typically there are four pipes in the presently preferred embodiment.) No attempt is made to maintain transmission order and to suffer with its associated overhead. This is, in fact, a key feature of the present invention in almost all of its embodiments.

Upon the issuance of a StartTransmit MMIO command, the adapter attempts to assign the work to forks off a pre-allocated Transmit task. If no Transmit tasks are currently available, then the readyToSend count in the appropriate LMT is updated, the bit that is associated with this adapter window is set in the bit vector and a work manager task is notified. The work manager task distributes transmit work to Transmit tasks as they become available. It is the work manager task's responsibility to update the readyToSend count in the LMT and the bit vector in the Global Registers (referred to also as "GR"; which are registers accessible to all adapter tasks) as the work is distributed.

On the "send side," the transmit threshold interrupt behaves exactly like the receive side. The use of interrupts is optional, and in fact, are not typically used for send side operation. The use of send and receive interrupts is optional. MMIO commands used for send side operations include:

a. StartTransmit—An MMIO that identifies how many send FIFO queue slots have just been prepared and are now ready to send. This count is used by the adapter to process the correct number of packets.

b. Set Interrupt Threshold—As with the receive side operation, this optional command allows the host code to identify when it would like an interrupt generated.

In addition, the host code may issue Adapter SRAM access MMIOs. However, they are of little value during normal operation.

LMT Contents

Presented below are the fields in the LMT data structure (in conceptual form) that are preferably employed.

```
//*************************************************************
// LMT Definition
//*************************************************************
Typedef struct
    {
        Recv_fifo_real_address   - Real address of the base of the Receive FIFO
        Window_state             - Window state (invalid, valid, etc)
        Recv_fifo_size           - Size of the Receive FIFO (encoded)
        Window_id                - Window id
        Recv_mask                - Mask for current slot from the recv_current_cnt
        Recv_current_cnt         - Receive current count for interrupt threshold
        Recv_fifo_avail_slots    - Receive FIFO number of slots available
        Recv_int_threshold       - Receive interrupt threshold
        Window_key               - Window key (used for protection)
        Rcxt_id                  - rCxt id associated with Window Fatal error
        Int_vect_data            - Interrupt vector entry with Window Fatal error
        send_fifo_real_address   - Real address of the base of the Send FIFO
        Config_parm_bcast        - Config parm - Enable sending broadcast pkts.
        Send_fifo_size           - Size of the Send FIFO (encoded)
        Send_quanta_value        - Count of send actions remaining in quanta
        Send_mask                - Mask to get current slot from send_current_cnt
```

-continued

```
        Send_current_cnt       - Send current count for interrupt threshold
        Send_fifo_ready_slots  - Send FIFO number of slots ready to process
        Send_int_threshold_hi  - Send interrupt threshold
        Rcxt_head              - Head rCxt of RDMA send queue for window
        Rcxt_tail              - Tail rCxt of RDMA send queue for window
        Rcxt_count             - Count of rCxts on RDMA send queue
} lmt_t;
```

What follows now is a description of the RDMA architecture.

Memory Protection Model

Memory regions are registered to a particular RDMA job. Protection granularity is per page. RDMA memory accesses, both local and remote, are validated by RDMA job id and buffer protection key. The job id is verified by comparing the job id (or window key) for the window with the job id assigned to the Translation Control Entry (TCE) Table (see below for a more detailed description of their use in the discussion for FIGS. 15, 16, 17 and 18). The memory protection key, which insures that the request uses a current view of the memory usage, is validated by comparing the key in the Protocol Virtual Offset (PVO; see below) with the key for the particular TCE Table entry being referenced. This insures that only the authorized job accesses its data and also provides protection from stale packets in the network.

For a better understanding of the present invention, it is desirable to consider the general operation of RDMA systems and methods. FIG. 1 seeks to answer the question: "What is RDMA?". In RDMA a master task running on one node is able to update or read data from a slave task running on another node. The exchange of information occurs through a switch or over a network. In RDMA the slave task executes no code to facilitate the data transfer.

FIG. 1 illustrates, at a high level, the concept of RDMA (Remote DMA) data transfer. Nodes 101 and 102 are interconnected in an RDMA capable network. The network may be "unreliable" in the sense described above. Master task 103 and slave task 104 are processes (tasks) running on nodes 101 and 102 respectively. The goal is for tasks 103 and 104 to be able to read and write to/from each other's address spaces as though they were reading and writing into their own address spaces. To enable RDMA operations, the assumption is that the tasks 103 and 104 are cooperating processes and have enabled regions of their address spaces to be accessible by other cooperating processes (through appropriate permissions). FIG. 1 illustrates an example of a two task (process) but the concept of RDMA transfer extends to any number of cooperating processes. In the example in FIG. 1, master task 103 is shown initiating an RDMA read operation to read the portion of memory in slave task 104 that is labeled 106 into its own address space labeled 105. The RDMA transport protocol enables this data transfer to occur without any active engagement (no protocol processing) from the slave task. The transfer here is shown as being made through switch 109 to which nodes 101 and 102 are connected via adapters 107 and 108, respectively.

Figure 2:
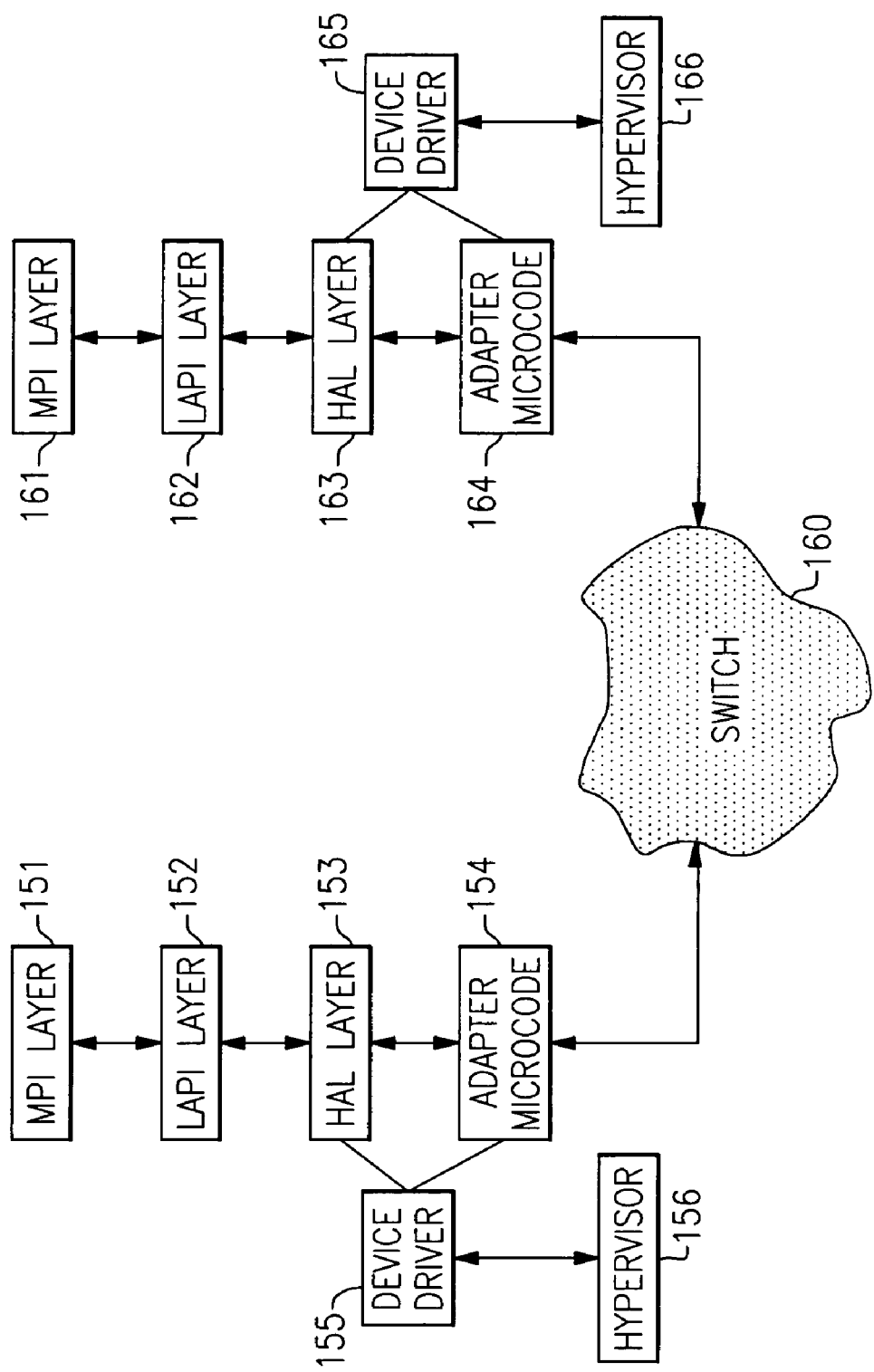
FIG. 2 is a block diagram illustrating a software layering architecture usable in conjunction with the present invention.

FIG. 2 illustrates a model for a layered software architecture for a user's address space. The model includes: Message Passing Interfaces (MPI) 151 and 161; Low-level Application Programming Interfaces (LAPI) 152 and 162; and Hardware Abstraction Layers (HAL) 153 and 163. Other equivalent Programming Models may also be employed in the RDMA environment. LAPI is a nonstandard application programming interface designed to provide optimal communication performance on a communications switch such as that employed in the IBM pSeries product line for multinode data processing systems. Message Passing Interface (MPI) is a standard communication protocol designed for programmers wishing to work in a parallel environment.

MPI layers 151 and 161 are the layers that enforce MPI semantics. Collective communication operations are broken down by the MPI layer into point to point LAPI calls: data type layout definitions are translated into appropriate constructs understood by the lower layers like LAPI and High Availability; message ordering rules are managed at the MPI layer. Overall the MPI layer enforces MPI semantics.

LAPI layers 152 and 162 provide a reliable transport layer for point to point communications. The LAPI layers maintain state information for all "in-flight" messages and/or packets and they redrive unacknowledged packets and/or messages. For non-RDMA messages LAPI layers 152 and 162 packetize messages into HAL send FIFO buffers (see reference numeral 203 in FIG. 3, for example, and elsewhere). However, for RDMA messages, the LAPI layers use HAL and device drivers 155 and 165 to set up the message buffers for RDMA. That is, they pin the pages of the message buffers and translate them. On the receive side, for non-RDMA operations, message packets are read from receive-side HAL FIFO buffers (see reference numeral 205 in FIG. 3 and elsewhere) and are moved into target user buffers. For reliable RDMA over an unreliable datagram service this is an important point. The state which calls for the redriving of messages is maintained in the LAPI layer unlike other RDMA capable networks like Infinband (IB). This elegant breakup of functionality also lends itself to an efficient striping and failover model which are also part of the present inventive description.

HAL layers 153 and 163 provide hardware abstraction to Upper Layer Protocols (ULPs like LAPI and MPI). The HAL layers are stateless with respect to the Upper Layer Protocols. The only state that the HAL layer maintains is that which is necessary to interface with the adapter. HAL layers 153 and 163 are used to exchange RDMA control messages between the Upper Layer Protocols and adapter microcode (see reference numerals 154 and 164. The control messages include commands to initiate transfers, to provide notifications of completion, and to cancel in-flight RDMA operations.

Adapter microcode (reference numerals 154 and 164) is used to interface with HAL layers 153 and 163 respectively for RDMA commands, and to exchange information regarding message completion and cancellation. In addition, adapter microcode is responsible for fragmentation and reassembly of RDMA messages directly from a source user buffer and to a target user buffer. The microcode fragments the packets of a message from the user buffer and injects them into switch network 160. On the receive side, adapter microcode reassembles incoming RDMA packets directly into target buffers. If necessary, adapter microcode (154 and 164)

also generates interrupts through device drivers (155 and 165, respectively) for appropriate ULP notification.

Device drivers 155 and 165 are used to setup the HAL FIFO queues for the user space Upper Layer Protocol to interact with switch 160 and adapters 107 and 108, respectively. Device drivers 155 and 165 also have the responsibility for fielding adapter interrupts, for opening, for closing, for initializing and for other control operations. Device drivers 155 and 165 are also responsible for helping to provide services to pin and translate user buffers to affect RDMA data transfer. Hypervisors 156 and 166 provide a layer which interacts with device drivers 155 and 165, respectively, to setup the address translation entries.

Besides simplifying adapter microcode design, the RDMA strategy of the present invention simplifies time-out management by moving it to a single place, namely to the Upper Layer Protocol (151, 152). As indicated earlier, it also improves large-network effective bandwidth by eliminating the locking of adapter resources until an end-to-end echo is received. The dynamically managed rCxt pool supports scalable RDMA, that is, allowing a variable number of nodes, adapter windows per node, and message transmissions per adapter window to be ongoing simultaneously without consuming the limited data transmission and receive resources of the adapter.

RDMA Write

Figure 3:
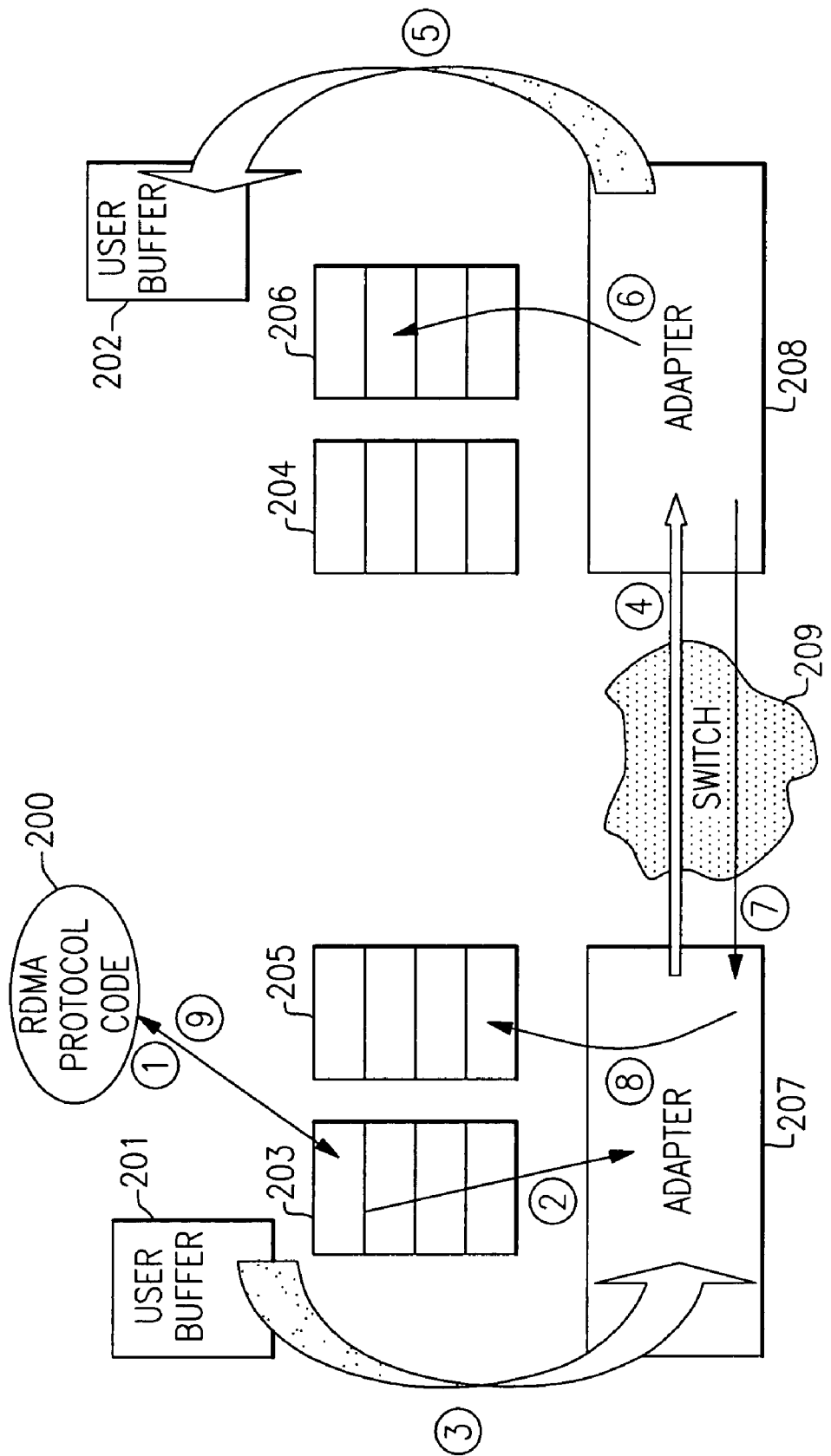
FIG. 3 is a block diagram illustrating the steps in a process for a RDMA write operation over a possibly unreliable network.

From the perspective of Upper Layer Protocol (151, 152), a write operation, using RDMA transfer, which is referred to herein as a "RDMAW" operation, begins with the posting of the RDMAW request to a adapter window send FIFO (that is, to a first-in-first-out queue; see reference numeral 203 in FIG. 3). The request is marked completed once the adapter microcode has taken responsibility for the request and no longer needs the request to be in the send FIFO. Upon successful delivery the RDMAW data to system memory, a header-only completion packet is delivered. The initiating task selects whether this completion packet is required, and if so, whether this packet should go to the source, or target task. See reference numeral 205 in FIG. 3.

A RDMA Write (RDMAW) request is issued to a local adapter window; its target is a remote adapter window. The RDMAW request specifies local and remote rCxt's, a tid, a local and a remote Protocol Virtual Offset (PVO), and a length. The local address is translated by the local adapter; the remote address is translated by the remote adapter. The RDMAW operation is posted by Upper Layer Protocol (151, 152) to the local adapter window FIFO as a header-only "pseudo packet." The rCxt, tid and PVO are important components in supporting not only the exactly-once delivery, but also in allowing out-of-order delivery of packets. The rCxt id identifies a particular transfer. The tid insures that the packets received belong to the current attempt to transfer this data (that is, that this is not a stale packet that somehow got "stuck" in the network). The data target PVO makes every packet self describing as to where in system memory the packet belongs, thus making out-of-order delivery possible. Further, the ULP never transmits two messages on the same window using the same tid, the adapter/microcode never retransmits any packets, and the switch does not duplicate packets.

Upon processing the RDMAW request, the local adapter generates as many packets as are required to transport the payload. Each packet contains in its header the remote rCxt, the tid, the total transfer length, the length of the specific packet, and the destination Protocol Virtual Offset (PVO) of the specific packet. Thus each payload packet is "self identifying," and the payload packets are processable at the target in any order. The local adapter considers the posted RDMAW to be completed when it transmits the last packet. At this point, the local adapter is free to mark the RDMAW as completed. Such completion does not signify that the payload has been delivered to the remote memory.

Upon receiving a RDMAW payload packet, the microcode at the target adapter validates the request (protection key, rCxt, tid, etc.). If the specified rCxt is invalid, the packet is silently discarded. The incoming tid is handled as follows. If it is less than the tid in the rCxt, the packet is discarded (that is, it is considered stale). If the incoming tid is greater than the tid in the rCxt, the incoming packet is treated as the first arriving packet of a new RDMAW. The specifics of the RDMAW request (including the tid, the total RDMA length and whether notification is requested at the master or slave ends) are copied to the rCxt the payload is DMAed into the appropriate offset in system memory, and the expected message length is decremented in the rCxt. If the incoming tid matches the rCxt tid, the payload is copied to system memory, and the expected length field is updated in the rCxt. If the rCxt remaining length is now zero, and the rCxt's outstanding DMA count is zero, the RDMAW operation is complete, and a completion packet is sent to the initiator window (if a completion notification was requested) after the data is successfully placed into system memory. The completion packet contains the rCxt number, and tid, and the packet is sent. If an arriving payload packet would cause a memory protection violation, the packet is discarded and a notification is sent to the ULP to assist program debugging (thereby ensuring that the RDMAW completion packet for that tid is never issued). The delivery of the RDMAW (the RDMA Write) completion packet to either the initiator or target sides of an RDMAW operation only takes place after the payload has reached the point of coherence at the target. Therefore, the completion message is the only acceptable indicator that the data has been successfully transferred, and that the RDMA operation has completed successfully. It should be noted that application programs have the responsibility of properly structuring RDMA transfer requests. If multiple RDMAWs, or RDMAWs and RDMARs, are issued concurrently with an overlapping target virtual Protocol Virtual Offset (PVO), no guarantees are made about the order in which the payloads are written to memory, and the results are undefined. However, a parallel job that does this should only impact itself. This result is not unique to the current implementation of RDMA.

Ordering Semantics and Usage Model

Note that the switch adapter may concurrently process multiple posted operations (both RDMAW and packet-mode) even for the same window. Note, too, that the ULP (Upper Layer Protocol) is responsible for retrying failed RDMAW operations (based on a ULP time-out criteria). When reissuing the RDMAW, the ULP must specify a tid greater than the tid value last used. The ULP may use a progressive back off mechanism when reissuing large RDMAW operations. After reissuing an RDMAW, the ULP ignores subsequently arriving RDMAW completions with stale tids.

FIG. 3 illustrates a sequence of steps that are employable to effect RDMA transfers over an unreliable transport network. The thinner arrows in FIG. 3 illustrate the flow of control information and the thicker, block arrows illustrate data transfer operations. FIG. 3 also includes numbered circles which provide an indication of the various steps employed in an RDMA transfer process in accordance with the present invention. These steps are described below in paragraphs numbered to correspond with the numbered circles in FIG. 3.

1. The Upper Layer Protocol (MPI, LAPI) submits an RDMA request with respect to HAL FIFO send queue 203. For the present discussion of FIG. 3, it is assumed that this is a write operation from a user buffer in the master task to a user buffer in the slave task. The request includes a control packet which contains information that is used by adapter microcode 154 to affect the RDMA transfer of the user buffer. For example, the control packet includes such items as a starting address, length of message, the rCxt ids (session or connection identifiers; see below for a complete description of this structure) to be used for source and destination sides and the notification model (that is, which side should be notified for completion, etc.). The adapter microcode uses the rCxt ids to identify the specific control blocks being used by the adapter microcode to maintain state information about the transfer, including the starting address, total transfer size, source and destination identifiers, and such, while the upper layer protocols use the rCxt ids to track the outstanding requests.
2. HAL layer 153 handshakes with adapter 207 to tell adapter microcode 154 that there is a new request for the microcode to process. The microcode DMAs the RDMA request into the adapter and parses it. The microcode extracts those fields necessary to affect an RDMA transfer. The microcode extracts then copies relevant parameters into the rCxt structure. See also FIG. 5 discussed below. Then the microcode uses the data source PVO to access the specified TCE Table, and verifies that the request meets memory protection requirements associated with each specific page of real memory involved in the transfer.
3. The microcode then DMAs the data from user buffer 201 and packetizes the data and injects the packets into the network and updates the rCxt state appropriately. This constitutes the sourcing payload part of the operation.
4. The packets of the RDMA message arrive at target adapter 208. These packets may arrive out of order (see FIG. 5) but are self describing packets with the appropriate PVO and payload length in each packet.
5. Receiving side microcode 164 reassembles the packets of the message in target user buffer 202 and updates the receive side rCxt appropriately. When the first packet of a new message arrives (identified by a new transaction identifier or tid in the packet) the appropriate rCxt is initialized. Subsequent packets of the message cause the microcode to update the appropriate rCxt on the receive side. This provides what is referred to herein as the "sinking payload" aspect of the RDMA operation. The RDMA protocol uses transaction id values (tid's) to guarantee "at most once" delivery. This guarantee is provided to avoid accidental corruption of registered memory. A tid is specified by the ULP each time it posts an RDMA operation. That transaction id (tid) is validated against the tid field of the targeted rCxt. For each given target rCxt, the ULP chooses monotonically increasing tid values for each RDMA operation. The chief aim of the rCxt and tid concept is to move, as much as possible, the responsibility for exactly-once delivery from firmware to the ULP. The rCxt and tid are used by the adapter microcode to enforce at-most-once delivery and to discard possible trickle traffic. The ULP uses this microcode capability to guarantee overall exactly-once delivery. The microcode uses the data target PVO to access the specified TCE Table, and verifies that the request meets memory protection requirements associated with each specific page of real memory involved in the transfer.
6. Once all the packets of the message are received, microcode 164 waits for the DMA transfer to receive user buffer 202 to be completed and then DMAs (that is, transfers via a direct memory addressing operation) a completion packet into receive FIFO queue 206 (if such a completion is requested).
7. Receive side microcode 164 then constructs a completion packet and sends it to source adapter 207 (if such a completion is requested).
8. Adapter microcode 154 on the source side DMAs the completion packet from receive side adapter 207 into source side receive FIFO queue 205. Steps 6, 7 and 8 represent the transmission of indications related to operation completion.
9. The Upper Layer Protocol at the source (151, 152) and destination (161, 162) end reads the appropriate completion packets to clean up the state indications with respect to the RDMA operation. If the RDMA operations do not complete in a reasonable amount of time a cancel operation may be initiated by the ULPs to clean up the pending RDMA status in the rCxt structures, or the ULP may redrive messages transmission using an updated tid. This failover and redrive mechanism is also part of the overall RDMA transmission process over unreliable transport mechanisms that forms part of the inventive description herein.

RDMA Read

The RDMA read operation (RDMAR) is very similar to the RDMAW operation with the only real difference being where the request comes from. A RDMAR is equivalent to a RDMAW issued by the opposite side (the target rather than the source). From the ULP's perspective, an RDMAR begins with the posting of the RDMAR request to a adapter window send FIFO queue. The request is marked completed once the adapter microcode has accepted responsibility for the request and no longer requires the FIFO entry. Upon successful delivery of the RDMAR payload to local system memory, a header-only completion packet is delivered as requested by the initiator.

To post a RDMAR, the initiator specifies the local and remote PVO, the length, the rCxt ids for both the local and remote windows and a tid. Like RDMAWs, RDMARs are posted as header-only "pseudo packets" to the adapter window's send FIFO queue. It is the ULP's responsibility to ensure that the local and remote rCxts are not otherwise in use, and the ULP specifies a tid larger than the last used local rCxt and remote rCxt tids.

The initiator microcode transmits the RDMAR request to the data source adapter. After successful transmission of the RDMAR request, the initiator microcode may mark the send FIFO entry as complete. This completion indicates to the ULP that the operation has been successfully started; it does not signify that the payload has been delivered to local memory.

Upon receiving a RDMAR request, the target microcode validates the request (protection key, tid, etc.). If the rCxt is invalid, the request is silently ignored. If the rCxt is busy, the RDMAR request is silently dropped. The incoming rCxt tid is handled as follows. If it is less than or equal to the rCxt tid currently stored in the local rCxt, the request is silently ignored. Otherwise, if the incoming tid is greater than the rCxt tid, the specifics of the request (PVO, initiator id, initiator rCxt, and other relevant fields) are copied to the rCxt. The rCxt is added to a linked list of rCxts waiting to be sent for the adapter window (for which purpose the LMT contains a rCxt head pointer, tail pointer and count), and the adapter window is marked readyToTransmit (in much the same manner as would happen in response to a locally issued StartTransmit MMIO command).

The target adapter, that is, the slave side that received the RDMAR, request packet is now responsible for sending the RDMA payload. This payload is sent in much the same manner as are RDMAW payload packets.

At the initiator, incoming RDMAR payload packets are handled in exactly the same manner as are incoming RDMAW payload packets. A completion packet (carrying the rCxt and tid) is delivered to the appropriate side(s) once the data has reached coherence in system memory.

The ULP determines which RDMAR has completed by inspecting the rCxt number, tid, and protocol-specific tags carried in the completion packet.

Note that the target microcode may interleave the transmission of RDMAR payload packets with other transmissions.

Note that the ULP is responsible for retrying failed RDMAR operations based on ULP time-out criteria. When reissuing the RDMAR, the ULP should specify a tid greater than the tid value last used. The ULP is advised to use a progressive back off scheme when reissuing large RDMAR operations. After reissuing an RDMAR, the ULP must ignore subsequently arriving RDMAR completions with stale tids.

Figure 4:
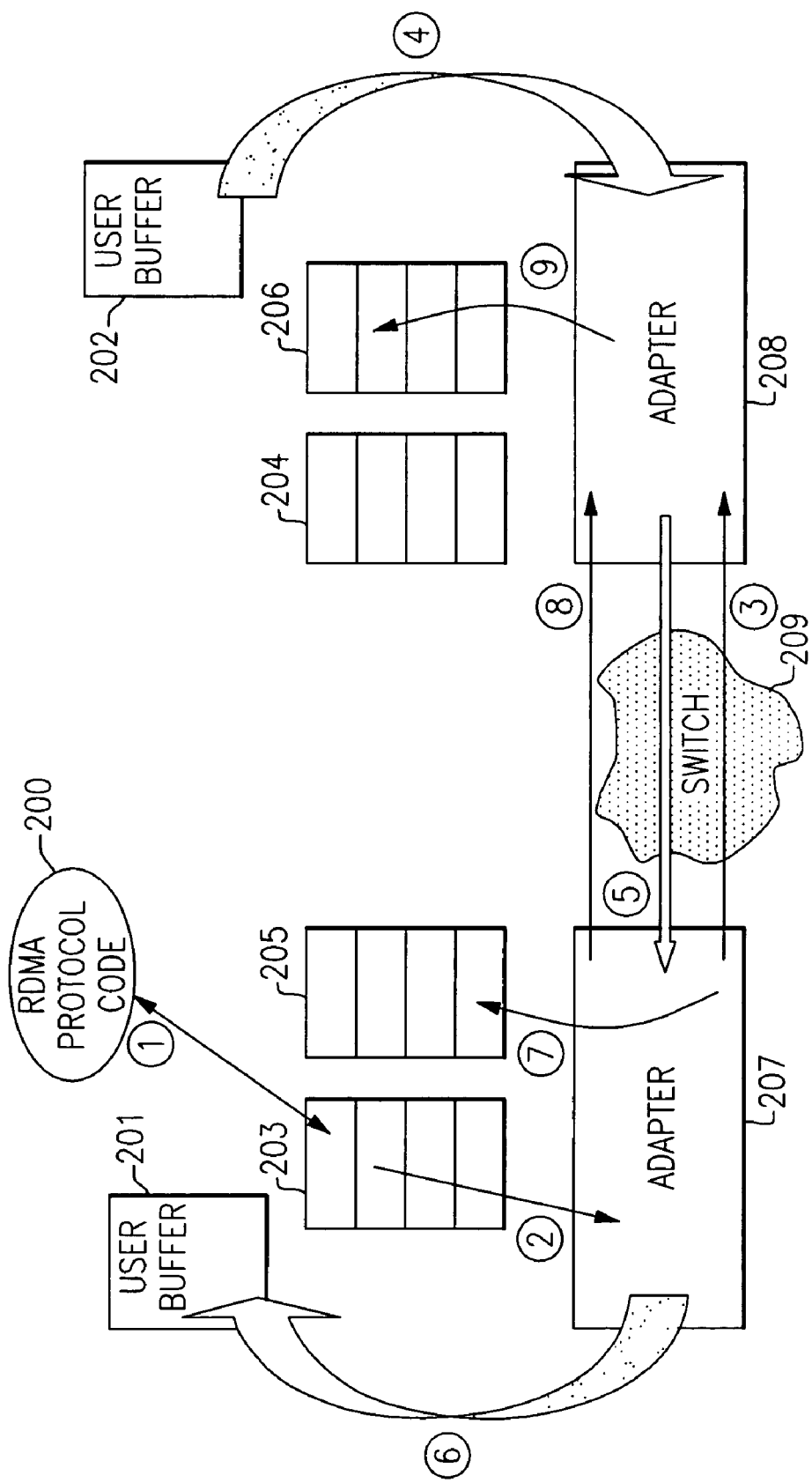
FIG. 4 is a block diagram illustrating the steps in a process for a RDMA read operation over a possibly unreliable network.

Attention is next directed to the process illustrated in FIG. 4 which is similar to FIG. 3 but which illustrates RDMA read operations over an unreliable datagram. Thus, FIG. 4, shows the equivalent flow for an RDMA read operation. As above and throughout, these steps are described below in paragraphs numbered to correspond with the numbered circles in FIG. 4.

1. The ULP from master task 103 submits an RDMA read request with respect to HAL FIFO send queue 203.
2. HAL 153 handshakes with adapter 207 and the adapter DMAs the command into adapter 207 which decodes the request as an RDMA read request.
3. The adapter forwards the command in a packet to appropriate slave adapter 208.
4. Slave side adapter 208 initializes the appropriate rCxt with the tid, message length, and appropriate addresses and starts DMAing the data from user buffer 202 into adapter 208 and then injects them into network switch 209. The appropriate rCxt state is updated with each packet injected into the network. The microcode uses the data source PVO to access the specified TCE Table and verifies that the request meets memory protection requirements associated with each specific page of real memory involved in the transfer.
5. Each of the data packets is transferred to adapter 207 on master node 101 over switched network 209.
6. With each data packet that arrives, master side adapter 207 DMAs it into the appropriate location as determined by the specified offset for user buffer 201 in system memory and updates the rCxt appropriately. The microcode uses the data target PVO to access the specified TCE Table and verifies that the request meets memory protection requirements associated with each specific page of real memory involved in the transfer.
7. Once the entire message is assembled into user buffer 201 adapter 207 DMAs the completion notification (if requested) into the receive FIFO queue 205.
8. Adapter microcode 154 then sends a completion notification as specified. In FIG. 4, the completion packet is shown being forwarded to slave side adapter 208.
9. Slave side adapter 208 then DMAs the completion packet into receive FIFO queue 206 on the slave side (if one is requested).

Figure 5:
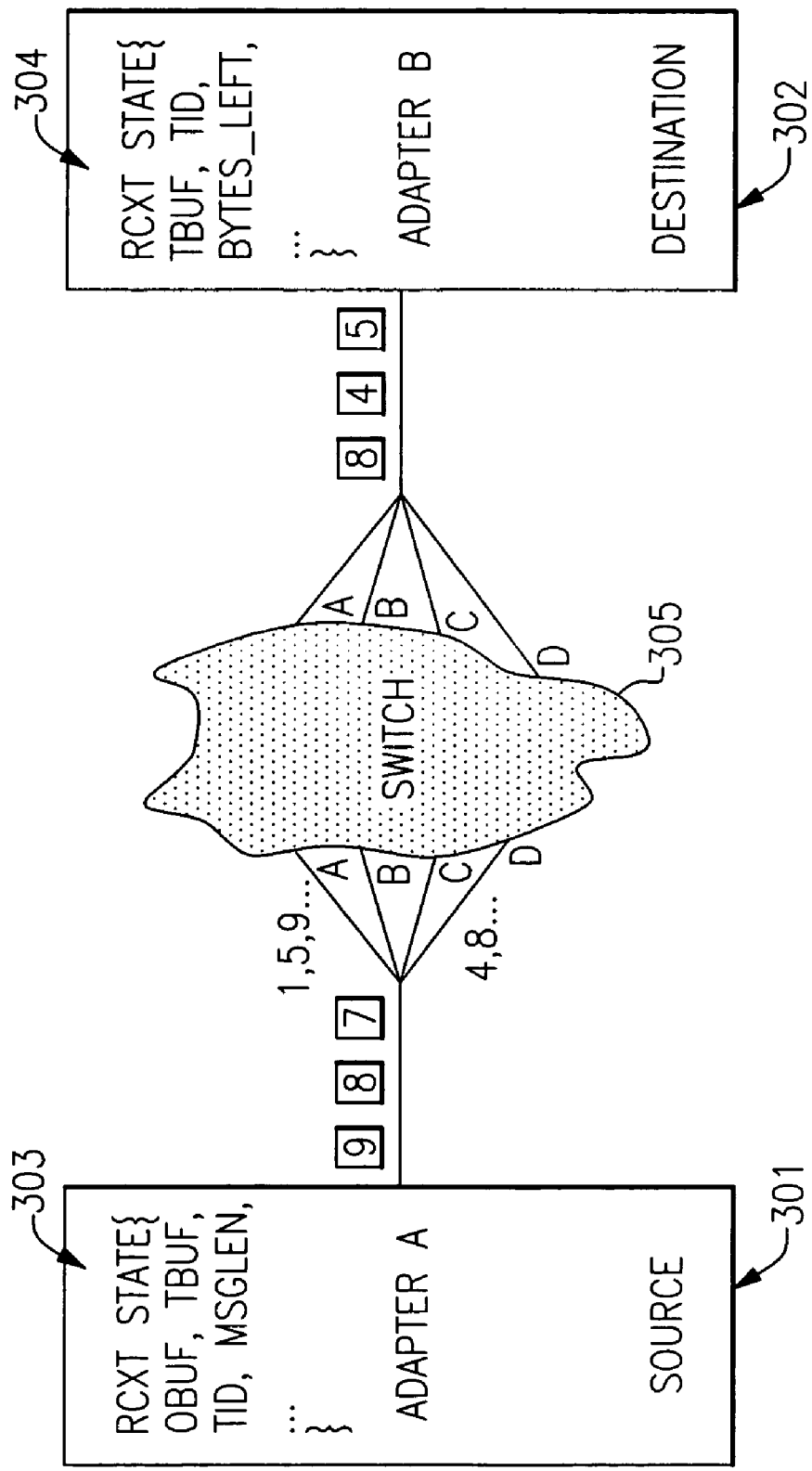
FIG. 5 is a block diagram illustrating the problem that packets sent in a certain order may not actually arrive in the same order and that they may in fact travel via multiple paths.

Attention is now focused on the fact that packets may not arrive in the order in which they were sent. Accordingly, FIG. 5 is now considered. FIG. 5, shows that RDMA over an unreliable datagram (UD) mechanism takes advantage of the fact that between source node 301 and destination node 302, there may be multiple independent paths (a, b, c and d in FIG. 5) through network 305. Packets of a message can be sent in a round robin fashion across all of the routes available which thus results in improved utilization of the switch and which also minimizes contention and hot spots within the switch. Packets arriving out of order at the receiving end are managed automatically due to the self-describing nature of the packets. No additional buffering is required to handle the out of order nature of the packet arrival. No additional state maintenance is required to be able to handle the out of order packets.

RDMA Context (rCxt) Structure

RDMA operations employ adapter state information. This state is contained in an RDMA context, called rCxt. RCxt's are stored in adapter SRAM. Each rCxt is capable of storing the required state for one active RDMA operation. This state includes a linked list pointer, a local adapter window id, two PVO addresses, the payload length, and the initiator adapter and adapter window id (approximately 32 bytes total in length). The rCxt structure declaration follows.

```
//*****************************************************************
// rCxt Structure
//*****************************************************************
typedef struct
{
    Lid                - source/target Logical id
    Remote_window      - Remote window
    Rdma_usr_cookie    - RDMA user cookie
    Rcxt_assigned      - 0: rCxt is not assigned to a window,
                         1: rCxt is assigned to a window
    Rcxt_key           - Key to protect rCxt from trickle traffic on reuse
    Local_window       - Local window
    Pkt_type           - RDMAR, RDMAW, etc.
    Complete_status    - Succeed or error (see below)
    Rcxt_direction     - 0: rCxt is being used for send,
                         1: rCxt is being used for receive
```

| | -continued |
|---|---|
| Rcxt_state | - 0: rCxt is free, no work active or pending |
| | 1: rCxt is on the LMT RDMA send queue |
| | 2: rCxt is in process of receiving |
| | (at least one pkt rcvd, not complete) |
| | 3: rCxt is on the send completion queue |
| Notify_on_completion | - Identify all parties to get notification after RDMA |
| Payload_size | - Payload size |
| Data_to_snd_rcv | - Amount of data remaining to send or receive |
| Total_RDMA_size | - Total data size for RDMA |
| RDMA_protocol_cookie | - ULP cookie |
| Data_source_rCxt | - Data Source rCxt |
| Data_target_rCxt | - Data Target rCxt |
| Next | - Next rCxt in send chain |
| } | |

One of the goals in allocating rCxt's here ought to be to have enough rCxt's to keep the pipeline full.

The ULPs acquire rCxt's from the device driver (see reference numeral 155). At the time of acquisition, the ULP specifies the adapter window for which the rCxt is valid. Upon acquisition (via privileged MMIO instruction or directly by device driver request) the adapter window number is put into the rCxt and the tid is set to zero. The pool of rCxt's is large (on the order of 100K), and it is up to the ULP to allocate local rCxt's to its communicating partners, according to whatever policy (static or dynamic) the ULP chooses. It is the ULP's responsibility to ensure that at most one transaction is pending against each rCxt at any given time.

The processes illustrated in FIGS. 3 and 4 employ RDMA operations on each side of the link for both read and for write operations. However, it is possible to employ a FIFO queue on one side or the other of the transmission process. FIGS. 6, 7, 8 and 9 illustrate processes that are applicable to this mode of operation. This variation in the RDMA process has advantages with respect to both latency and bandwidth. They also avoid setup operations on the remote side.

Half RDMA and Half FIFO Operations

Existing transport mechanisms provide FIFO (or packet) mode of transport or RDMA mode of transport between a sender and receiver. For these transport mechanisms the sender and receiver follow the same protocol (that is, either FIFO or RDMA). For many applications it is important to be able to take advantage of RDMA on one side (either the sender or the receiver) and FIFO on the other side. In this embodiment of the present invention, it is shown how the RDMA structure provided by herein permits this feature to be efficiently enabled through an intelligent structuring of the FIFO queue and RDMA structures and flow. Usage of these combination models is important in programming situations where RDMA can only be accomplished from/to contiguous locations in memory and if one of the source or destination buffers is noncontiguous. In other situations the sender/receiver protocol may not be able to specify a priori the location of the various buffers from/to which the data transfer is to occur. In these situations the ability to issue a half RDMA operation allows the transport protocol to take advantage of RDMA on at least one end while exploiting the flexibility of using FIFO and parsing data as it is sent out (or absorbed from the network before scattering them into their respective target locations). This mode of operation also has value for operations like "accumulate" where the receiver of the data performs an accumulation operation on all of the data from the various senders participating in the accumulate reduction operation. In such cases the sending side can use RDMA since the CPU does not need to touch any of the data to effect the transfer, but on the receive side the data is better staged through a FIFO queue so that the receive side processors can parse the data packets in the FIFO queue and perform reduction operations like "accumulate," as the packets of the reduction message arrive, or any other reduction operation (like max, min, or any other parallel prefix operation) which requires that, at the receiving end, the CPU has to operate on the incoming data and can take advantage of pipelining the reduction operation as it processes packets from the FIFO queue overlapping this operation with the rest of the arriving data. In addition we illustrate how this is accomplished reliably over a possible unreliable datagram transport.

Figure 6:
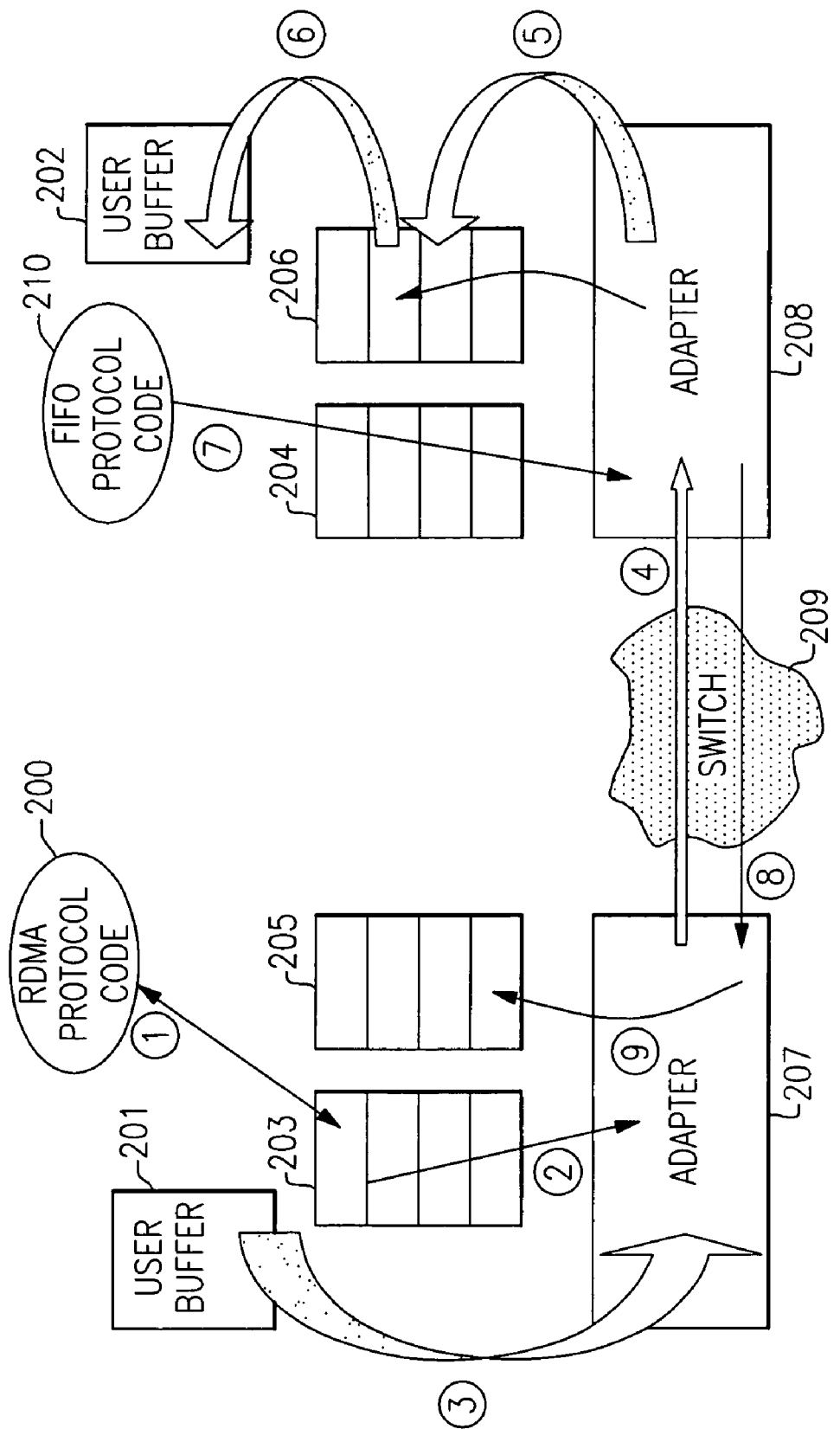
FIG. 6 is a block diagram similar to FIG. 3 but more particularly illustrating a half-send RDMA write operation over a possibly unreliable network.

With respect to FIG. 6, the process shown illustrates a half-send RDMA write operation over network 209. The process of transferring data in this fashion is illustrated in the following steps:

1. RDMA protocol 200 submits a half-RDMA command request with respect to HAL FIFO send queue 203.
2. Adapter 207 DMAs the command and parses it
3. Adapter 207 sets up the send side RDMA, performs TCE and other relevant checks as discussed earlier, and pulls the data from send user buffer 201 into adapter 207 and fragments it into packets with appropriate headers and injects the packets into network 209. With each packet sent, adapter 207 updates the state information appropriately as in the case of regular homogeneous RDMA transfers.
4. The data is sent over the network to receiving side adapter 208.
5. Receiving side adapter 208 assembles incoming RDMA packets in receive side FIFO queue 206.
6. The protocol parses the incoming RDMA packets and takes responsibility for placing them in the correct order and for ensuring that all of the packets have arrived and then scatters them into appropriate target buffers 202 (which may or may not be contiguous).
7. FIFO protocol 210 submits a completion message through receive side send FIFO queue 204.
8. Receiving side adapter 208 pushes the completion packet over the network to the sender.
9. Sending side adapter 207 pushes the completion packet into receiving FIFO queue 205 which the protocol uses to update completions and for reuse of messaging buffers. The completion packets are optional and are as specified by the Upper Layer Protocols as in the homogeneous RDMA case.

Figure 7:
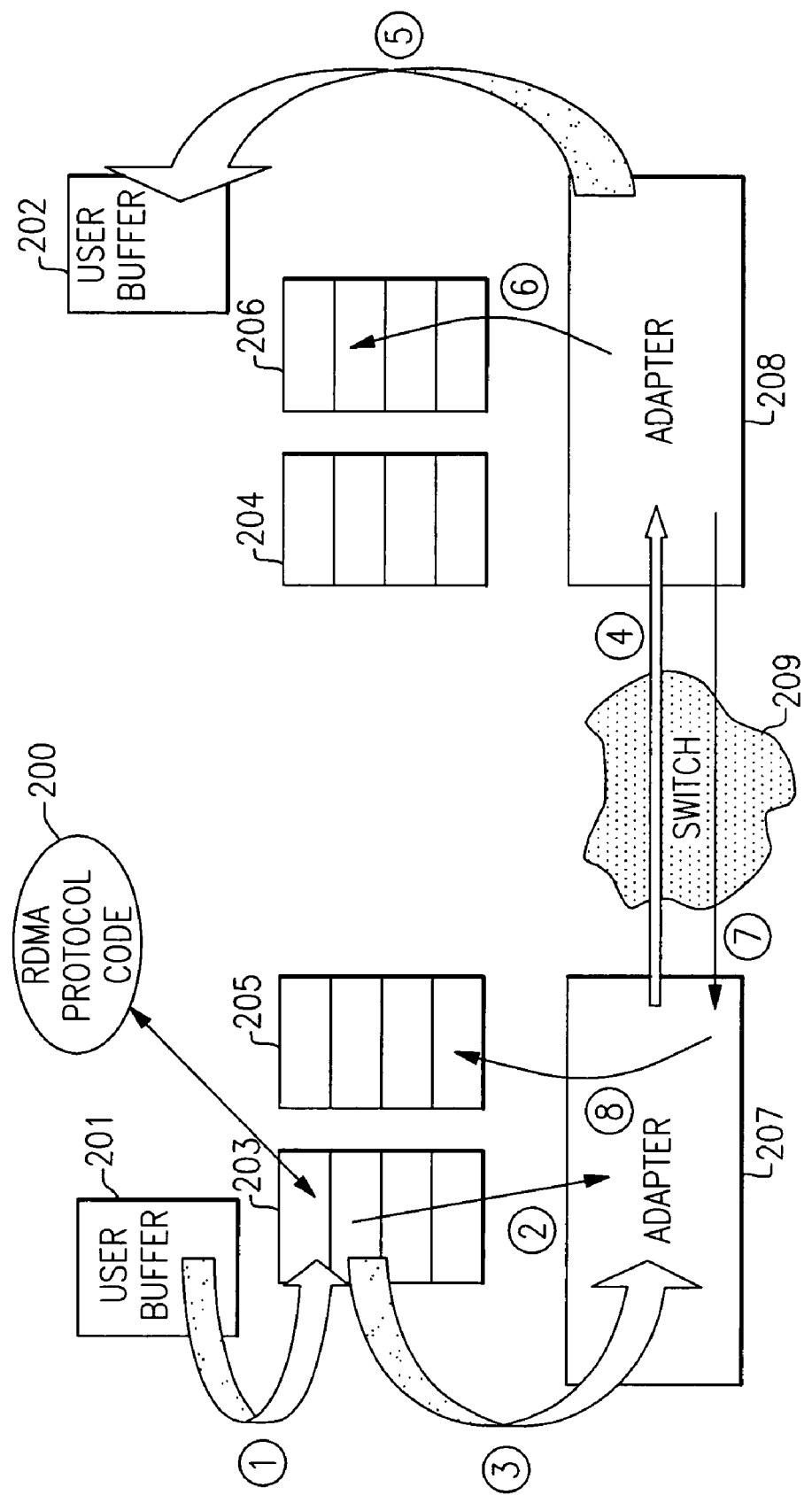
FIG. 7 is a block diagram similar to FIG. 3 but more particularly illustrating a half-receive RDMA write operation over a possibly unreliable network.

With respect to FIG. 7, the process shown illustrates a half-receive RDMA write operation over network 209. The process of transferring data in this fashion is illustrated in the following steps:

1. RDMA protocol 200 on the sending side copies data from user buffer 201. For this aspect of the present invention, it is noted that this data may be scattered in multiple locations and may have varying lengths. Nonetheless, protocol code 200 places this data into the send FIFO queue 203.
2. Adapter 207 DMAs the request portion from the FIFO queue 203 and parses the request.
3. Adapter 207 then DMAs the packets themselves from send FIFO queue 203 into adapter 207.
4. Adapter 207 processes the independent send FIFO requests as components of a single RDMA write request, and ensures that the appropriate RDMA header information is provided so that the receiving side sees this as a pure RDMA write operation. Once ready, the adapter injects the packets into the network.
5. Receiving side adapter 208 receives the RDMA packets, performs TCE Table and other relevant checks as discussed earlier, and assembles the data directly into receive user buffer 202.
6. Once all the packets of the message are received, receiving side adapter 208 DMAs a completion packet into receive FIFO queue 206.
7. Adapter 208 also pushes a completion packet back to the sender through the network..
8. Sending side adapter 207 places the completion packet in the appropriate slot in receive FIFO queue 205 on the send side for the Upper Layer Protocol to use. The completion packets are optional as with the homogeneous RDMA process as shown in FIGS. 3 and 4.

Figure 8:
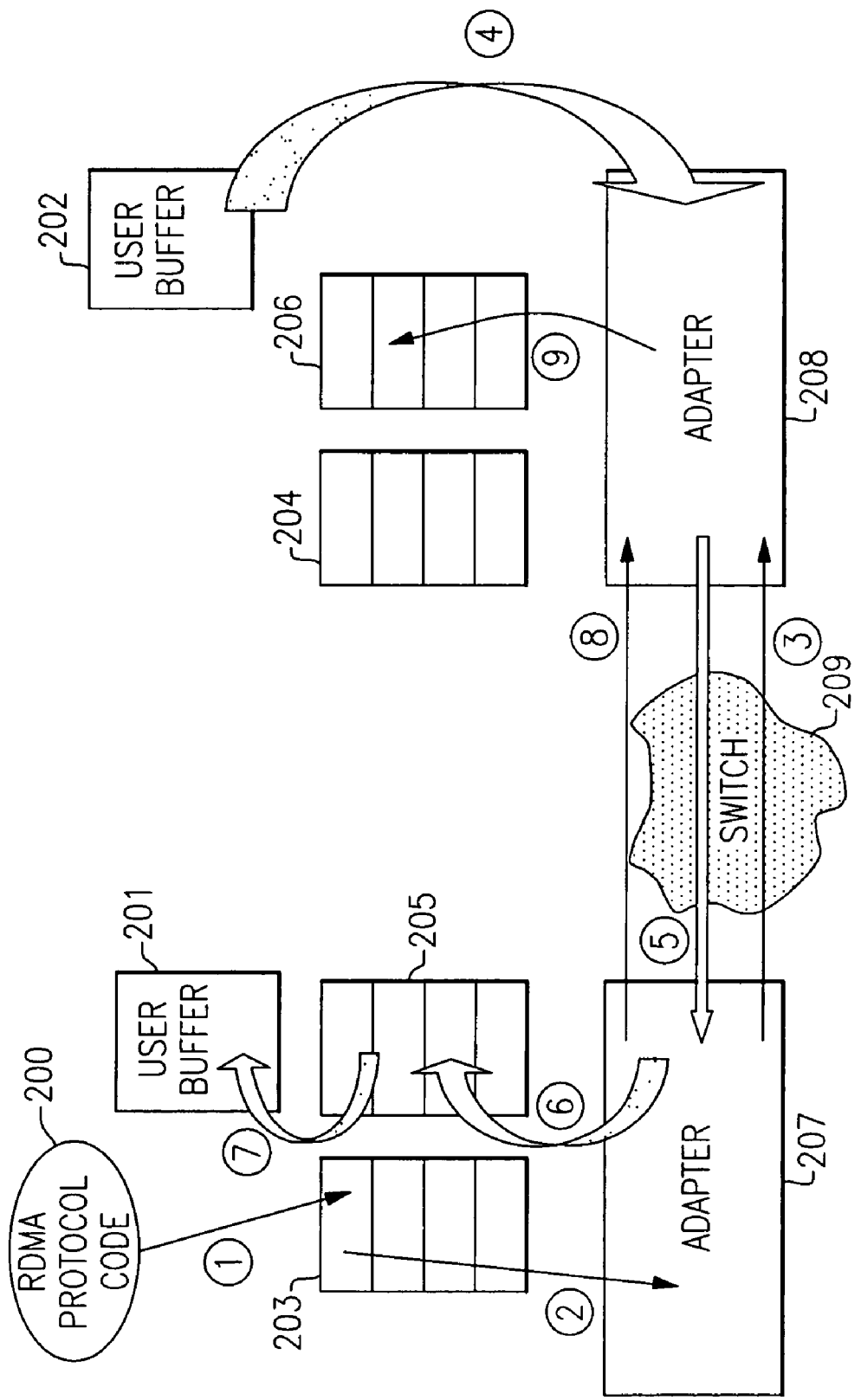
FIG. 8 is a block diagram similar to FIG. 3 but more particularly illustrating a half-send RDMA read operation over a possibly unreliable network.

With respect to FIG. 8, the process shown illustrates a half-send RDMA read operation over network 209. The process of transferring data in this fashion is illustrated in the following steps:

1. RDMA protocol 200 submits a Half Send-RDMA read request with respect to HAL FIFO send queue 203.
2. Adapter 207 DMAs the half RDMA command into adapter 207 and parses it. It then sets up the local RDMA control structures.
3. Adapter 207 injects the packet into the network to send it to target adapter 208.
4. Target adapter 208 sets up the appropriate control structures, performs TCE Table and other relevant checks as discussed earlier, and DMAs the data directly from user buffer 202 into adapter 208.
5. Adapter 208 fragments the data and injects the packets of the message into network 209 to send back to the requester.
6. Requesting adapter 207 gathers the RDMA packets as they arrive and DMAs them into the Receive FIFO queue 205.
7. RDMA protocol 200 then copies the data from receive FIFO queue 205 into the appropriate user buffers 201 which may or may not be contiguous.
8. Adapter 207 pushes a completion packet to source data adapter 208. Note that this operation can be overlapped with Step 7.
9. Source data adapter 208 then pushes the completion packet into the receive FIFO queue 206 for the ULP to process. As with other cases, the completion packets are optional and the selection is made by the ULP.

Figure 9:
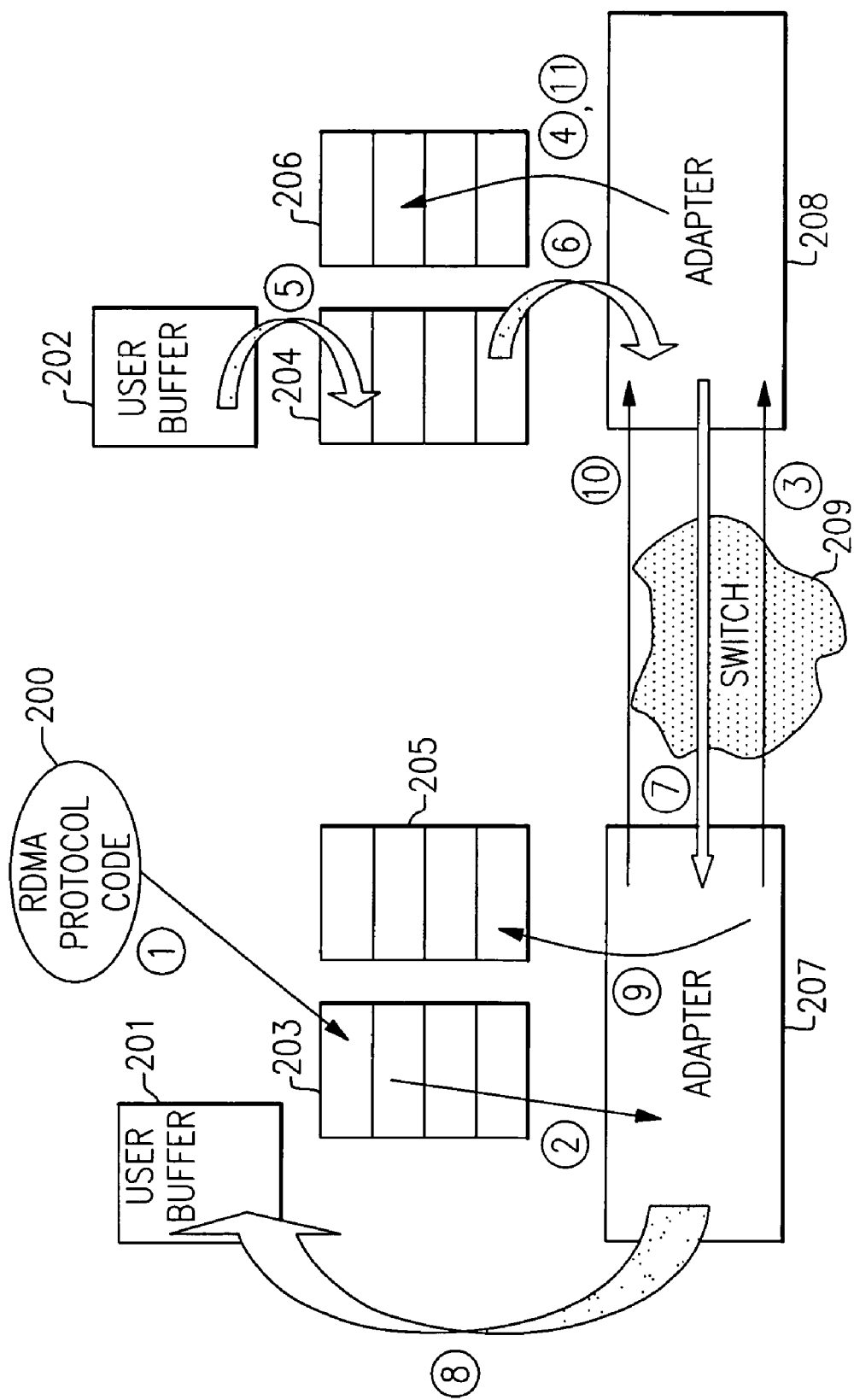
FIG. 9 is a block diagram similar to FIG. 3 but more particularly illustrating a half-receive RDMA read operation over a possibly unreliable network.
Figure 10:
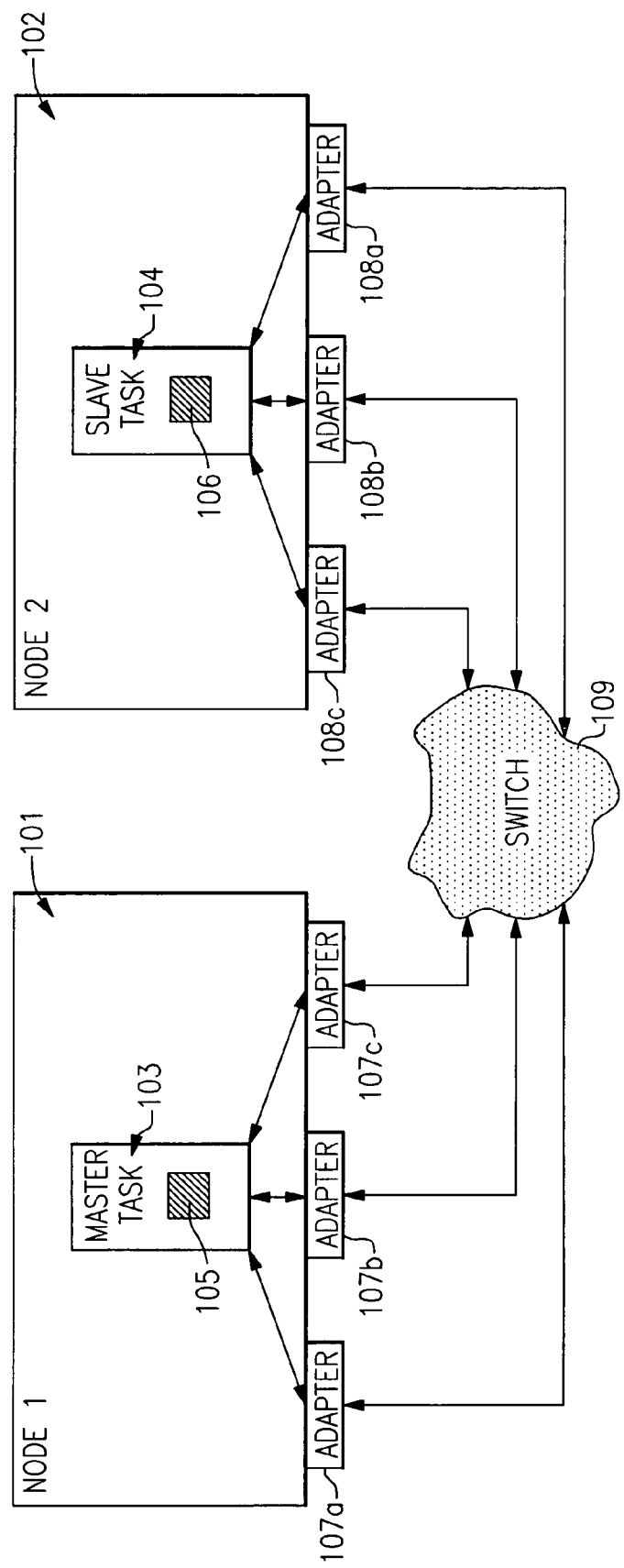
FIG. 10 is a block diagram illustrating the use of broadcast and/or multicast operational modes.

With respect to FIG. 9, the process shown illustrates a half-receive RDMA read operation over network 209. The process of transferring data in this fashion is illustrated in the following steps:

1. Protocol 200 submits a half recv-RDMA read request with respect to FIFO send queue 203.
2. Adapter 207 DMAs the request from FIFO send queue 203 and parses it.
3. Adapter 207 sends the packet into the network 209 to source adapter 208.
4. Source side adapter 208 parses the packet and places it in receive FIFO queue 206.
5. The ULP parses the request in receive FIFO queue 206 and then uses FIFO mode to copy the packets from user buffer 202 into send FIFO queue 204. This transfer from user buffer 202 is not necessarily from contiguous locations; in point of fact, it may very well be from various noncontiguous locations.
6. Adapter 208 DMAs the packets into adapter 208.
7. Adapter 208 converts the packets into RDMA formatted packets and sends them to originating adapter 207.
8. Initiating adapter 207, upon receiving the data, performs TCE Table checks, and directly assembles the data in user buffer 201.
9. Once all of the packets are received, initiating adapter 207 places a completion packet into receive FIFO queue 205 of the initiator for the ULP to process. As with other modes this operation is optional, based on the selection by the ULP.
10. Initiating adapter 207 also pushes a completion packet back to source adapter 208.
11. Source adapter 208 then DMAs the completion packet into source side receive FIFO queue 206 which is then processed by the ULP. The completion packets are optional and are determined by selections made by the ULP.

It is noted that the half-receive RDMA read is one of many possible implementation options that extends the use of the other three half-RDMA approaches described above.

Remote Direct Memory Access with Striping over an Unreliable Datagram Transport

Attention is now turned to one other advantage provided by the mechanisms presented herein. More particularly, the ability to process read and write operations in an RDMA fashion without concern for the order of packet arrival provides an opportunity to use multiple paths for the transmission of data packets. This in turn provides the ability for the protocols to efficiently stripe a message (or different messages) from a single task across multiple network interfaces to exploit the available communication bandwidth in parallel.

For a programming model where there is one task of a parallel job per CPU, it is important for efficiency that the tasks run with minimal disruption of the CPU from interrupts and other tasks. This becomes a difficult problem to address when striping across multiple paths by each task becomes necessary to exploit the full bandwidth of the network. For such models, an efficient RDMA striping model with pipelined RDMA requests is described herein. This pipelined model has the following advantages:

a. Pipelined RDMA requests are issued in a tight loop by a single thread thus minimizing overhead and allowing multiple network interfaces to be used in parallel;
b. There is no spawning of additional threads necessary to achieve parallelism and no synchronization and dispatching overheads to worry about;

c. There is no interference of the other tasks of a parallel job running on various CPUs to achieve striping performance;

d. All the benefits of offloading fragmentation and reassembly and minimizing of interrupts are present.

An important component of the present usage model is that there is the option to present notification of the completion of RDMA operations at both ends. This is important for IP (Internet Protocol) transactions and for some user space programming models. It is also needed for the ULPs (user space and IP) to ensure cleanup of RDMA resources and possibly to redrive the transfer through non-RDMA paths in the event of failure.

With respect to striping, the IP transport layer has a reserved window in presently preferred embodiments of adapter systems attached to a node and can use multiple sessions (streams or sockets) to drive a significant portion of the IP stack in parallel realizing more bandwidth for the IP application than possible through a single session and adapter. For systems which are memory bandwidth limited this mechanism provides for possible increased bandwidth realized by IP.

Figure 13:
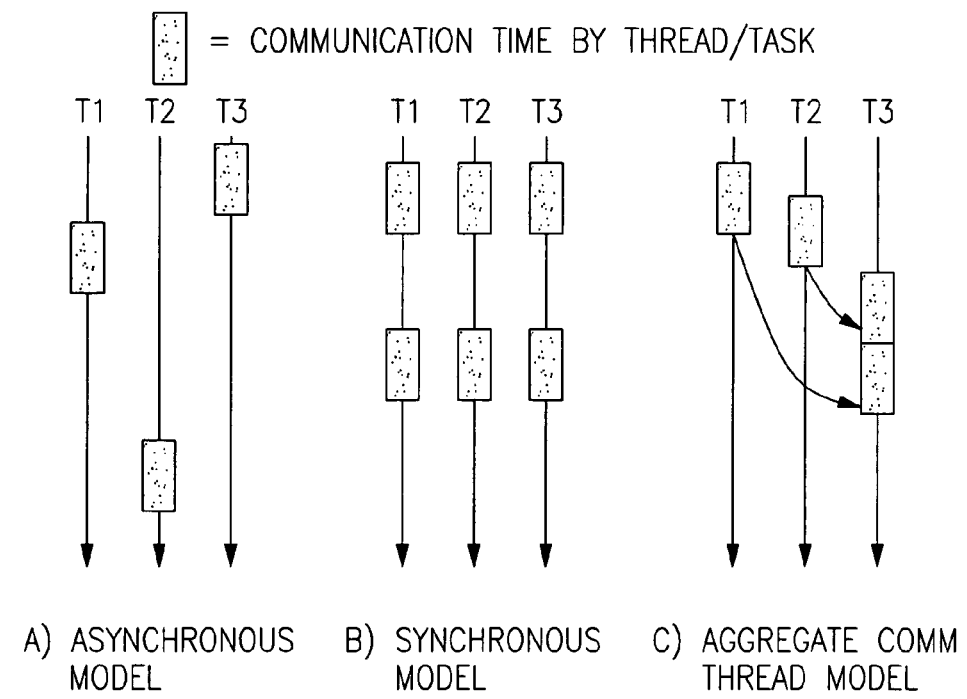
FIG. 13 is a timing diagram illustrating striping across multiple paths.
Figure 12:
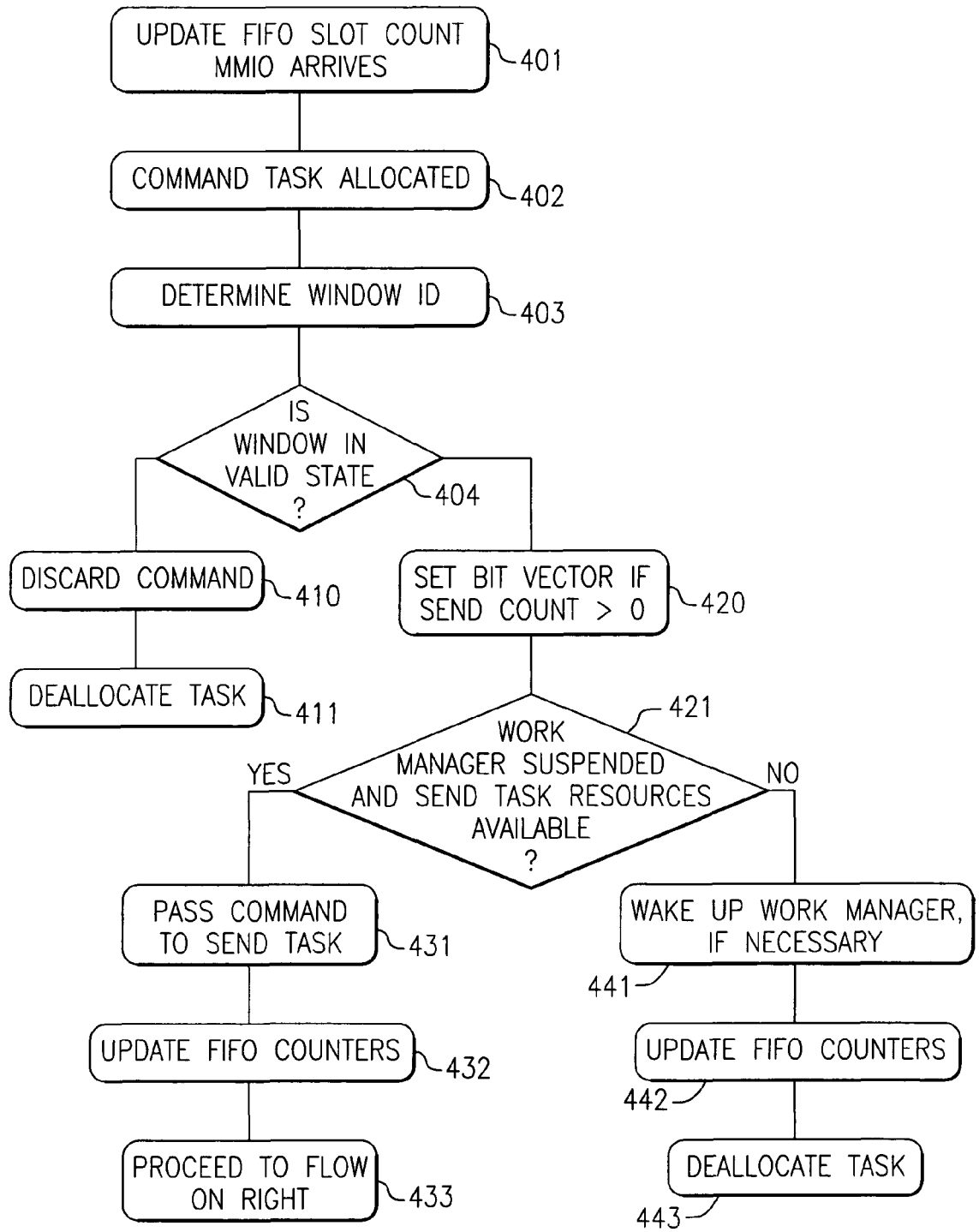
FIG. 12 is a flow chart illustrating possible adapter operations involved in handling a request from the CPU to either transmit a data packet or begin an RDMA transfer.

Striping is now discussed in terms of its use with and its effects using the MPI (Message Passing Interface) and LAPI (Low-level Application Programming Interface) protocols. There are various options in the level of striping that can be supported:

(i) tasks of a parallel job can make sure they stripe different messages to go through different network interfaces. This works well in most cases although it makes the out-of-order arrival of MPI messages more probable resulting in corresponding protocol overheads;

(ii) a task can split up a large message and stripe parts of the message through different network interfaces. In this mode there is additional synchronization overhead on both the sending and receiving side. This additional synchronization overhead can be a noticeable latency overhead as well. There are three different cases to consider (detailed in FIG. 13 and as discussed below).

a. Asynchronous Communication Model: If tasks of a parallel application that are on the same node, make communication calls at different times during the execution of the parallel program, then RDMA operations allow the communicating task to stripe and transfer data in parallel across multiple network interfaces without impacting the tasks running on the other CPUs. See FIG. 13a. This mode allows making all of the unused network adapter. resources available to the one task that is communicating. This mode banks on the fact that different tasks embark on communication at non-overlapping times in which case there is significant benefit to the application. The difficulty clearly is that the message passing library mapped to a particular task has no knowledge of whether the other tasks on the node are in their communication phase. Hence exploitation of this capability is quite tricky and not immediately obvious. It is possible that the application determines that the communication model is asynchronous by taking into account the environmental settings (for example, interrupts enabled) and by choosing to use RDMA in such cases. However, if interrupts are enabled then there is another issue to be considered with respect to context switching when messages complete and interrupts are generated. This introduces three additional problems:

i. context switch overhead;
ii. interrupt handler dislodging a running application task; and
iii. interrupt handler needs to be targeted to the CPU to which the message belongs.

Note that these issues are also present (possibly more so due to the extra interrupt count) with the conventional "send/recv" model.

b. Synchronous Communication Model: If tasks of an application executing on the same node issue communication calls at the same time then clearly striping provides no additional value and may in fact hurt the performance of each transfer due to additional synchronization overhead and the interference caused by all tasks using all the adapters at the same time (multiple MMIO handshakes, time-slicing of the adapter for various tasks, etc.). Use of striping (independent of RDMA) is not desirable in this situation. See FIG. 13b.

c. Aggregate Communication Thread Model: In this model, there is only one task per node and there are multiple threads in the task driving computation in each of the CPUs. See FIG. 13c. Threads that need to communicate queue it up to a thread that is dedicated for communication. Clearly, in such a model the communication thread benefits from striping and using RDMA to transfer messages while the other threads compute. If the compute threads are waiting for the message transfer to complete, then there is no advantage to RDMA in this case.

Third Party, Broadcast, Multicast and Conditional RDMA Operations

The mechanism which enables an out-of-order data transfer RDMA system also provides a corresponding ability to carry out broadcast operations, multicast operations, third party operations and conditional RDMA operations. Each of these is now considered and the use of an out-of-order RDMA mechanism is described illustrating how it is used to carry out these various objectives and protocols.

Figure 14:
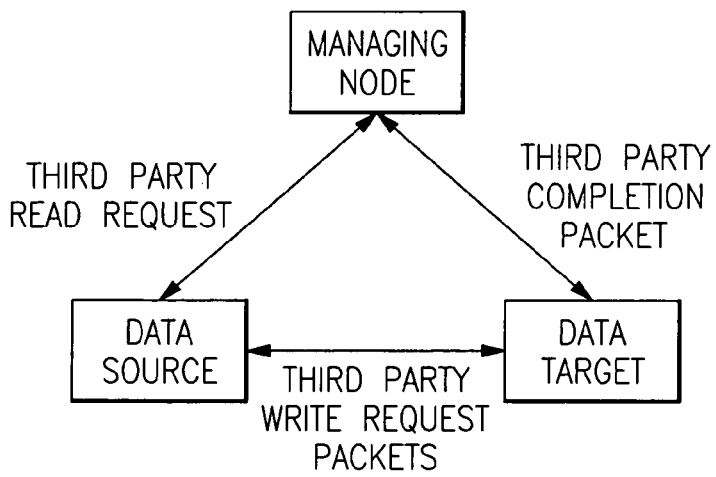
FIG. 14 is a block diagram illustrating the exchange of information that occurs is a third party RDMA operation.
Figure 23:
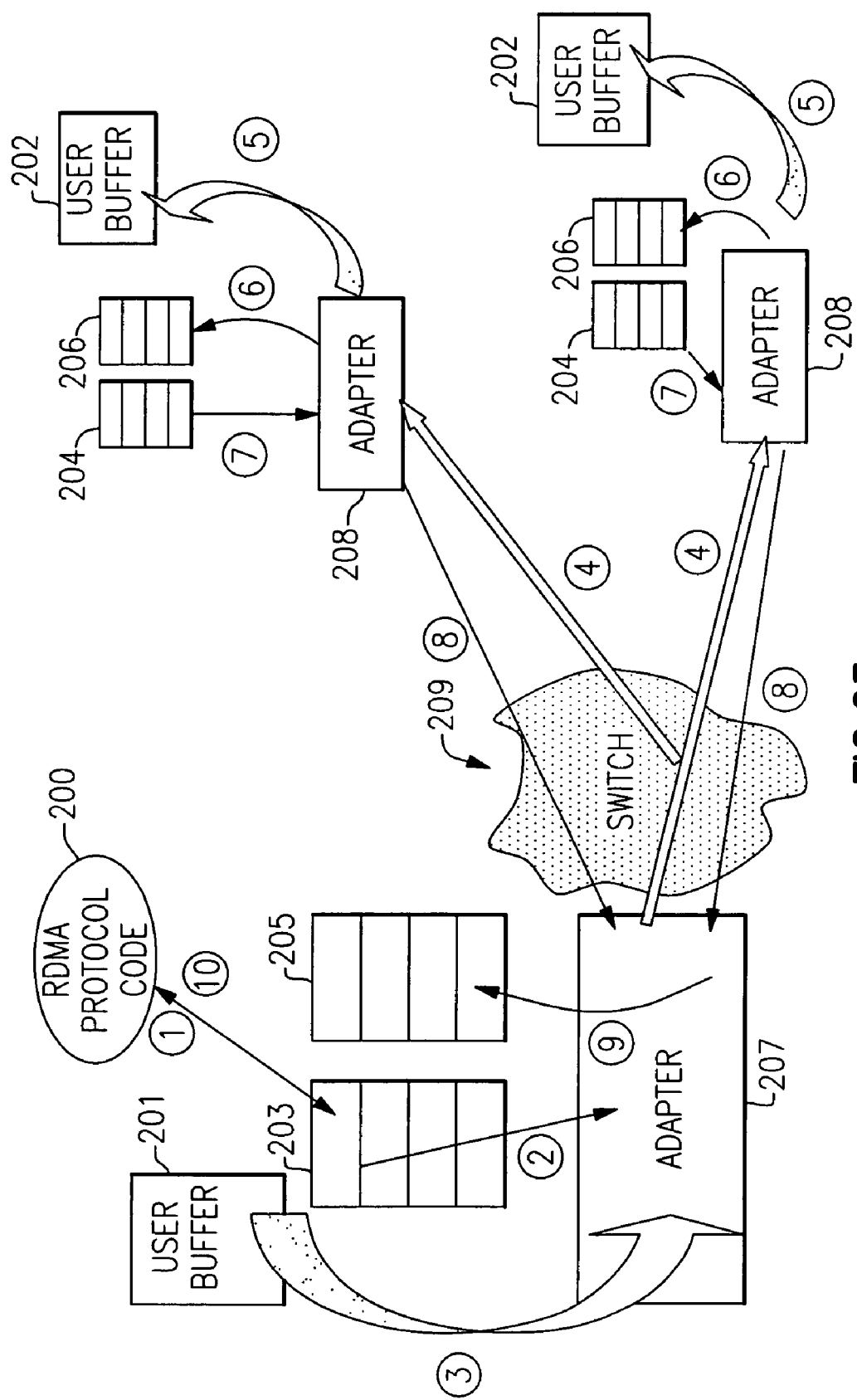
FIG. 23 illustrates the process steps involved in the performance of RDMA operations in which packets are broadcast to different locations.

Third party RDMA operations are considered first. The present invention provides the ability for a single central node in a cluster or network to be able to effectively and efficiently manage the transfer of data between other nodes, or to create a means for allowing a directed distribution of data between nodes. See FIGS. 14 and 23. These sorts of situations have traditionally been solved using complex logic. The present approach allows these directed transfers to be made without the direct knowledge or involvement of either the data source or data target nodes. The concept here is for the managing node to send a special RDMA request to an adapter on the data source node requesting that an RDMA transfer be executed with a particular data target node. When the data transfer is complete, the third party controller is designated as the recipient of the completion notification. These kinds of third party transfers are very common in DLMs (Distributed Lock Managers) and elsewhere. An example of the usage of DLMs is in file systems. A node "A" in the cluster may make a file system read/write request. The request gets forwarded to one of the DLM table manager nodes "B." The DLM table manager handles the request, checks its tables and determines that Node "C" owns the blocks of data that node "A" requests access to. Node "B" can now send a third party RDMA transfer request to node "C" asking node "C" to send the requested data to node "A" and to notify node "B" when the transfer is complete. The ability to efficiently implement third party RDMA is central to such applications. Another example of a programming model of this kind is found elsewhere in certain applications which employ a "ping" operation which has very similar semantics. Such models eliminate the need for node "B" to send information back to node "A" asking it to fetch the requested data from node "C." Third party transfers thus help to cut down the number of handshake operations that must normally be performed to effect such transfer.

More particularly, this process involves controlling or managing a node so that it "knows" the available rCxt ids, current tids and the memory structure of the data source and data target nodes. The controlling or managing node constructs a Third Party RDMA Read Request packet, which is almost identical to a RDMA Read Request except for the new packet type and the inclusion of a new field that specifies the identity of the data target adapter. See FIG. 14.

When the data source adapter receives the Third Party RDMA Read Request packet and verifies the rCxt key, tid, etc., it swaps the node ids for the source and the data target, and initiates the operation to send the data to the data target adapter. Except for the initialization of the packet header, the operation is identical to any other RDMA send operation. All RDMA data packets sent contain the packet type of Third Party RDMA Write Request.

When the data target adapter receives the Third Party RDMA Write Request packets, they are processed just as the adapter would process any RDMA Write Request packet, by first setting up the local rCxt, and then by moving the data into the appropriate location in system memory. The only difference between a RDMA Write Request and a Third Party RDMA Write Request is with respect to the destination of the completion packet. Normally the adapter sends the completion packet to the data source adapter, but here it sends it to the controlling or managing adapter identified in the new field of the packet header.

Broadcast RDMA Operations

The problem being solved by this aspect of the present invention is that of providing the efficient distribution of data to multiple nodes in a cluster or network. Although broadcast is not a new concept, broadcast RDMA is new since it allows for the data to be placed within specific ranges in target node memory.

The basis of this approach is to merge the RDMA operation with the ability of the hardware to support broadcast packets. In this process, a single data source within the network or cluster efficiently distributes large amounts of data to all of the other nodes in the system. If the transfers are done with target side notification, then the target side upper layer protocols send unicast acknowledgments to the data source indicating that they have successfully received the data. Failure to receive such unicast notification can then be employed to drive a retry targeted at the single failing recipient.

This operation is enabled by having RDMA Broadcast configurations, including rCxt ids and the system memory configurations support the PVOs being used. The data source node uses a rCxt id, current tid and PVOs that are acceptable to the target adapters.

When the data source adapter sends an RDMA broadcast packet, it sets up the packet header just as it would any RDMA Write Request packet, except that the target adapter id is set to the broadcast id, and it requests a completion packet to the data target side only (the packet type is set to RDMA Write Request). The completion packet that is passed to the data target receive FIFO queue identifies the source of the data to the protocol. It is then up to the upper level protocol (ULP) to manage any selective retransmission that may be required.

More particularly, the broadcast RDMA operation is performed by providing RDMA Broadcast configurations, including rCxt ids and system memory configurations to support the Protocol Virtual Offsets (PVOs) being used (see also below under Failover Mechanisms). The data source node uses an appropriate rCxt id, current tid and PVOs that are acceptable to the target adapters.

When the data source adapter sends a RDMA broadcast packet, it sets up the packet header just as it would any RDMA Write Request packet, except that the target adapter id is set to the broadcast id, and it requests a completion packet to the data target side only (the packet type is set to RDMA Write Request). The completion packet that is passed to the data target receive FIFO identifies the source of the data to the protocol. It is then up to the upper level protocol to manage any selective retransmission that may be required.

Multicast RDMA Operations

The problem being solved by this aspect of the present invention is the ability to provide support for things such as IPv6 on a cluster, where data needs to be distributed to multiple but not all nodes within a cluster. This approach provides such support by taking advantage of a special use of Broadcast RDMA.

In this aspect of the present invention, the underlying approach is to is to have special purpose RDMA Contexts that are reserved for this use. If the RDMA Contexts are defined and ready, then the node receiving these broadcast packets receive the data, otherwise they do not. These RDMA Contexts provide for the selective distribution of data in much the same way that a multicast address is used in network adapters. As with the Broadcast RDMA, the multicast RDMA uses unicast notifications from the data target to manage retransmissions.

The Multicast operation is identical to the broadcast operation described above, except that only a select subset of the data target adapters are provided with the RDMA Contexts (rCxts). Although the packet is seen by all adapters on the network, it is only processed by those which have the rCxt defined. All other adapters simply discard the packets.

Conditional RDMA Operations

The problem being addressed by this aspect of the present invention is the efficient management of a list of actions where later transactions are dependent upon the successful completion of earlier operations. This is traditionally managed by having the high level protocols coordinate such dependent operations, and only issue the dependent operation to the adapter once the earlier operations are completed.

In this aspect, the present invention also allows an application program to queue multiple related RDMA requests using multiple rCxts to the adapter, and to specify their relationship. This is performed by having the application program place a new RDMA Conditional entry in the Send FIFO command followed by the component RDMA requests.

One use for this operation is to perform a set of RDMA Write operations, followed by a signal to the data target that all of the set of RDMA Write operations have completed successfully. In this scenario, the data source adapter monitors RDMA Completion packets, and once all of the set of RDMA Write operations has completed, it starts an RDMA Write operation that acts to signal the data target.

The present invention also allows an application program to queue multiple related RDMA requests using multiple rCxts to the adapter and to specify their relationship. There are a variety of ways to implement dependent sets of operations of this kind. A preferred implementation works as follows:

1. One or more RDMA requests are placed into the send FIFO by an upper layer protocol, with a new notification option which specifies that the completion packet is targeted to the adapter itself (rather than to the upper layer protocol). In addition, it contains a specific conditional queue identifier.
2. One or more Conditional RDMA requests are placed into the send FIFO queues by the same upper layer protocol (ULP). Each such entry contains the same specific conditional queue identifier as was specified in the component RDMA requests, as well as a conditional state specification which indicates under which conditions this statement should be executed.
3. As each RDMA completion packet arrives, a counter associated with the appropriate conditional queue identifier is adjusted in a predefined way, and the associated conditional queue is checked for operations whose conditions have been met.
4. When a conditional RDMA request's condition has been met, that request is placed onto the regular RDMA send queue for the appropriate window, and is executed as any regular RDMA request.

This implementation is made more usable with the addition of send FIFO commands that allow conditional queues and counters to be manipulated (such as clearing or setting to some particular count) and queried under upper layer protocol (ULP) control.

One use for this operation is to perform a set of RDMA Write operations, followed by a separate RDMA operation to signal to the data target that the larger set of operations have completed successfully. In this scenario, the data source adapter monitors RDMA Completion packets, and only once all of the set of RDMA Write operations has completed will it start an RDMA Write operation that will act to signal the data target.

Early Interrupt Notification in RDMA Operations

Interrupts are used by communications adapters to inform the device driver that there is something ready for it to process. Typically, the interrupt is generated only when the data or entry to be processed is already in system memory. The present invention is also advantageous in that improvements are provided in interrupt handling. In particular, the present invention enables significant improvements in the performance and flexibility of a clustered or network of data processing nodes by improving the interrupt handling abilities of the system. In this aspect of the present invention, the adapter generates an interrupt as soon as possible rather than waiting for all of the data to be in system memory. This allows the interrupt processing overhead to run in parallel with the movement of data, thus providing a significant performance benefit as long as there is a CPU which is free to process the interrupt code early, which is usually the case. The present invention is also particularly applicable and beneficial in the circumstance in which multiple interrupt handlers are present. The invention allows for multiple threads to be managing interrupts from a single adapter, so as to make overall system improvements possible. It should also be noted that processing of the interrupt table does not necessarily have to be done within the interrupt handler, but can be implemented as a function of the driver that is triggered by the interrupt handler. Therefore, what is thus provided is the ability to have multiple threads that allow multiple copies of the interrupt table being handled concurrently. Performance tuning is, however, desired to ensure that applications are structured in a manner that benefits from this optimization feature.

Considerations of early interrupt notification are presented first. In the interest of obtaining the best possible performance, especially with respect to latency, within a cluster environment, the need to overcome overhead associated with interrupt management stands out as a very desirable goal. Typically there is little that can be done to overcome this problem outside of attacking the interrupt management path itself. However, the present invention provides an alternative.

The interface between the adapter and the upper layer protocols uses send and receive FIFO queues which have a well defined structure. Each slot or entry in these FIFO queues is initialized to a known value by the upper layer protocol, and only once this value changes, does the upper layer protocol assume that the entry is complete. To ensure this, the adapter writes the first cache line of the entry (where this special signal is stored) after all other data in the entry has reached coherence in system memory.

In this aspect of the present invention the adapter generates an interrupt to indicate that the data is available prior to the data reaching coherence within the system. In this way, the system software overlaps processing of the interrupt itself with that of the adapter storing the remaining data into system memory. If the system software reaches the point of reading the FIFO queue before the first cache line has been successfully written, the system software can poll on the entry awaiting its completion, and there is no exposure to data corruption, but the interrupt overhead has been masked. The early interrupt notification mode is enabled only in the case that the CPU is not busy doing application work.

Attention is now directed to considerations present when Multiple Interrupt Handlers are involved. As mentioned above, the present invention is useful in overcoming some of the concerns relating to the latency associated with the handling of interrupts. There are multiple ways of addressing latency, including the early notification approach discussed above. An alternate approach is to provide multiple resources for managing interrupts. Since the hardware used in the adapter herein allows for multiple interrupt levels to be used concurrently for LPAR (Logical Partition) sharing support, the hardware is now used differently by registering multiple interrupt handlers from a single LPAR.

The system enables multiple interrupt levels using a configuration setting at adapter initialization. The adapter currently tracks the state of a single interrupt handler as either ready or not ready. Upon presenting an interrupt, the interrupt handler is assumed to be not ready. The interrupt handler notifies the adapter that it is ready for another interrupt via an MMIO. This concept is easily expanded to manage multiple interrupt handlers. As interruptable events occur, the adapter checks for an available interrupt handler, and provide that interrupt handler, or the next one to become available, with the latest information about events that are pending.

Snapshot Interface in RDMA Operations

Attention is now directed to those aspects of the present invention which are related to the use of a snapshot interface. This aspect provides significant performance advantages in multiprocessor interfaces by introducing a nonblocking means for synchronizing operations between processors.

In terms of this present invention, a snapshot interface exists between processors, where one processor (the master) issues a command to another (the slave), and the master needs to determine when the slave has completed the requested operation. Although this is a common interface issue, it becomes more complex when:
- the slave processor has multiple tasks running asynchronously;
- the tasks on the slave processor may suspend indefinitely waiting for certain hardware events;
- performance goals prohibit the tasks from checking the latest state of whenever they are dispatched after a suspend; or
- command tasks, those tasks handling commands from the master, are not allowed to suspend or block waiting for the completion of the other tasks.

An example of one situation where this invention is useful is when the device driver or hypervisor must know when a potentially disruptive command such as "Close Window" has completed before it performs some subsequent action such as releasing system memory that is associated with that Window. Another use for this invention occurs when there is a need for one task to ensure that all other tasks processing packets for the same message are completed before reporting message completion to the system processor.

This nonblocking mechanism operates by having the disruptive action, such as the "Close Window" command, produce a snapshot of the current state of the adapter microcode. Bits in the snapshot are cleared as ongoing activity completes. When the snapshot changes to all zeroes, then the device driver knows that all of the microcode tasks have seen or will see the new state.

Figure 19:
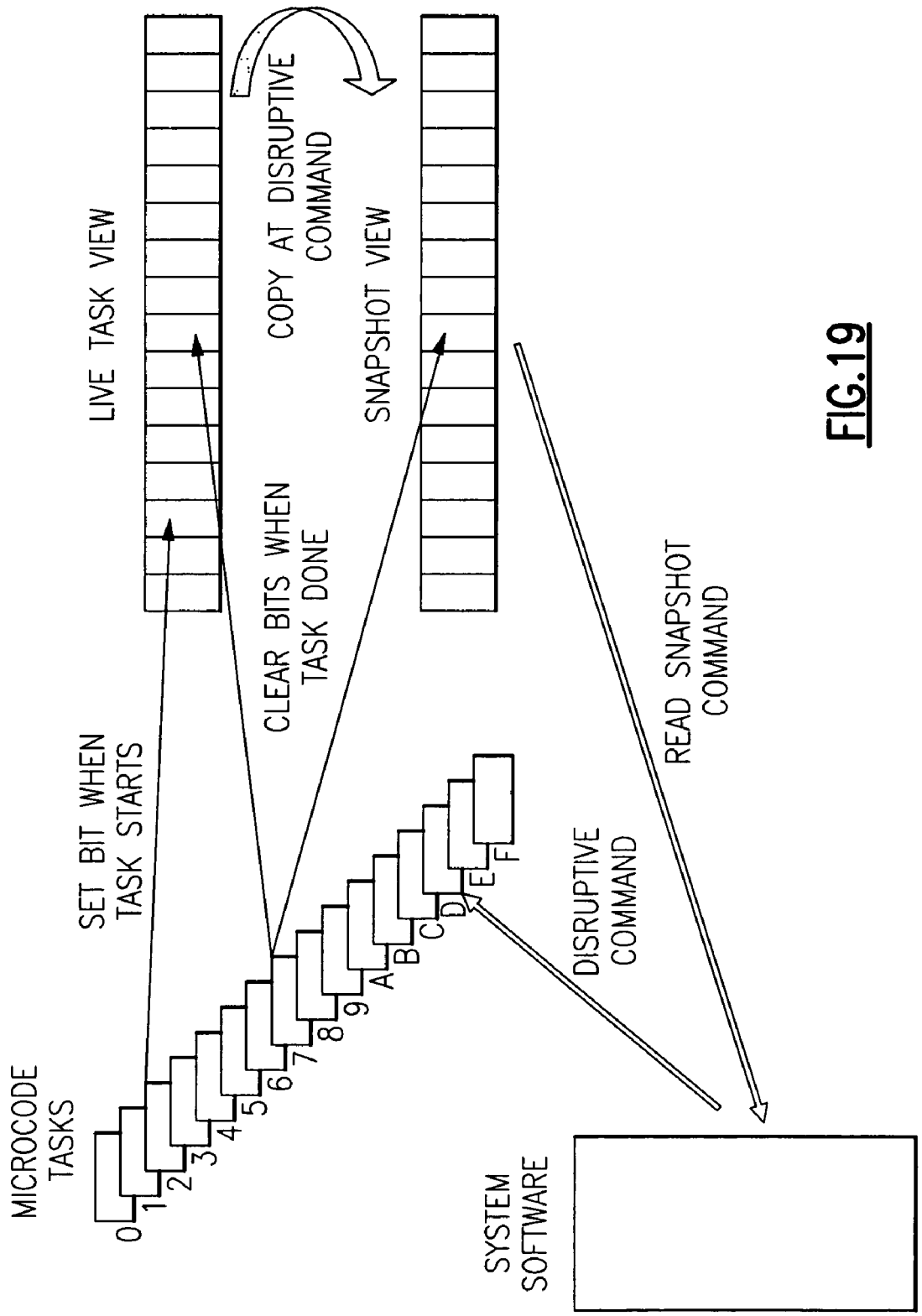
FIG. 19 is a block diagrams illustrating the structure and use of the snapshot capabilities of the present invention.

The steps in this process may be understood with respect to FIG. 19. The Live Task View register tracks the state of each task running on the adapter. Whenever a task starts, whether processing a command, sending a packet, or handling a received packet, it sets the bit corresponding to its task id in the Live Task View register. When the task completes its operation, it clears that bit prior to moving on to another operation, suspending, or deallocating task.

When system software issues a disruptive command, such as a Close Window command, it needs to ensure that all tasks running on the adapter are aware of the change before it performs other operations such as releasing system memory associated with the window being closed. Therefore, when processing the Close Window and other disruptive commands, the command task copies the Live Task View register to the Snapshot View register. Whenever a task completes an operation, it clears the bit associated with its task id in both the Live Task View register and the Snapshot View register. Once all tasks that were active at the time of the disruptive command have completed the operations in progress at the time of the disruptive command, the Snapshot view register becomes all zeroes.

The system task can periodically issue a Read Snapshot command after having issued the disruptive command. The Read Snapshot command returns the current state of the Snapshot View register. When the Read Snapshot command returns a value of zero, the system task can then safely assume that no tasks on the adapter are still operating with old state information.

Failover Mechanisms in RDMA Operations

The use of various aspects of the present invention also introduces the additional concern of how to deal with so-called trickle traffic. Trickle traffic can be defined as data received from the network that is stale but may have all the signatures of a valid packet data. The present invention deals with RDMA trickle traffic for persistent subsystems after LPAR reboot and adapter recovery events. It is important to be able to eliminate trickle traffic for persistent subsystems that use RDMA since this can cause data integrity problems and/or message passing failures. An LPAR reboot is considered to be a failure or administrative event that takes place within a node. An adapter recovery event is issued and executed in response to a failure within an adapter. Since out-of-order RDMA over an unreliable datagram transport is a novel approach to data transfer, there are no existing solutions to this problem. It is important to note that the solution to trickle traffic for Zero Copy data transport used by persistent subsystems in the past does not work for RDMA since they relied on a two sided protocol support. For RDMA since the problem is twofold (detailed below) the solution provided herein is also twofold:

1. For the trickle traffic protection associated with an LPAR reboot, a random number is used to seed the generation of keys embedded in the Protocol Virtual Offset (PVO) generated by the device driver. The adapter checks the key embedded in the PVO (PVO.key) of every RDMA packet header received from the network with the key that the device driver embeds in the TCE (TCE.key) entry that the PVO references. If the PVO.key from the packet is stale, the adapter drops the packet and a fatal error is signaled. The persistent subsystem then closes and then reopens its window to recover from the fatal error. Trickle traffic of this type should be very rare due to the amount of time taken to reboot an LPAR. This solution provides an adequate resolution for RDMA trickle traffic elimination for persistent subsystems using RDMA after an LPAR reboot.

2. To solve the problem of trickle traffic after adapter recovery events there are three possible solutions presented in summary below and described in greater detail thereafter:
   a. Use a round robin mechanism to assign rCxts (RDMA Contexts) to protocols. This reduces the possibility (but does not eliminate it) that the same jobs will get the same rCxts after the adapter recovery event. Assignment of a different set of rCxts to jobs following an adapter recovery event will cause the adapter's rCxt window ownership check to fail for stale packets.
   b. Persistent subsystems can deregister and reregister their memory regions with the device driver. This causes the PVO.key and TCE.key of the buffer to change, enabling the adapter to detect stale RDMA packets when it enforces it's PVO.key=TCE.key check (as described in the LPAR reboot solution above).
   c. A key field is embedded in the rCxt ID (rCxt_id.key) and a rCxt key (rCxt.key) is added to rCxt data structure in adapter memory. The keys are set equal to a counter that tracks adapter recovery events when the device driver assigns rCxt resources to windows. The adapter validates that the rCxt_id.key in all incoming packets match the rCxt.key value stored in the rCxt array in adapter memory. Incoming packets that fail the adapter's rCxt key check are silently discarded. After recovery is complete, the persistent subsystems need to communicate the rCxt ID change via a broadcast, rendezvous or piggybacked off the existing group services mechanisms. The currently preferred implementation uses a rendezvous mechanism to inform the other nodes of the rCxt ID change.

As indicated above, these solutions are now described in greater detail:

Elimination of trickle traffic for a persistent subsystem after an LPAR reboot Random PVO/TCE key seed generation by the device driver provides one possible solution. When the persistent subsystems are initialized they have to register memory regions that they intend to use for RDMA operations with the device driver. The device driver calculates a PVO for each memory region registered. The PVO for each memory region contains enough information to allow the adapter to index into the correct TCE table and fetch the real page address of the ULP's memory region, calculate the offset into that real page address, and the PVO.key that is used to validate the PVO is not stale. The PVO.key is used to provide inter-application debug information and stale packet detection. At device driver configuration time the system's time base register is used to seed the generation of PVO/TCE keys. This random seeding of the device drivers PVO/TCE key generation insures that the keys generated are different for the same buffer across reboots. The adapter checks that the TCE.key saved in kernel (or hypervisor) memory matches the PVO.key in all RDMA packets. This check prevents packets sent to this adapter with a stale PVO (trickle traffic) from reaching the protocols.

Elimination of Trickle Traffic for a Persistent Subsystem after Adapter Failure

1. One solution is to use a round robin mechanism to assign rCxt (RDMA Contexts) to protocols: all protocols, including persistent subsystems, acquire rCxt, which are adapter resources needed for RDMA operations, from the device driver during initialization. The device driver maintains the available rCxt in a linked list. It hands out rCxt from this list when the protocols acquire them and then adds them back to this list when the protocols free them. If the device driver allocates the rCxt using the head of the linked list and then frees them using the tail of the linked list we can virtually guarantee (if we have a large number of rCxts) that the protocols never get the same set of rCxt. The adapter is designed to verify that the all rCxts used in RDMA operations are valid by conducting two checks. The first rCxt check is to insure that the rCxt is owned by the current window by checking the rCxt's rCxt.window field in adapter memory. The second check made by the adapter verifies that the rCxt_id.key for the RDMA operation matches the rCxt.key field in adapter memory. Both the rCxt.window and rCxt.key fields in adapter memory are initialized by the device driver when rCxts are assigned to windows. Since protocols are required to reacquire rCxts after any adapter recovery event, this round robin allocation mechanism guarantees a very high probability that they will get a disjoint set of rCxts, and that stale RDMA (trickle traffic) packets will fail the rCxt key check. In the presently preferred implementation we do not have a large enough set or rCxts for this round robin allocation method to guarantee all stale RDMA packets are detected. The number of rCxts needed for the round robin allocation method to guarantee protection requires two times (or more) rCxts in the rCxt pool as would ever be outstanding between adapter failures. Round robin allocation is used for rCxt in our implementation for debug ability reasons.

2. One solution is to provide persistent subsystems that deregister and reregister memory regions with the device driver: all persistent subsystems are required to deregister their memory regions when they are notified of an MP_FATAL event. After recovery is complete they can reregister their memory regions with the device driver causing the device driver to change the PVO and TCE keys for each of the memory regions. Any stale RDMA packets that reaches the adapter after the recovery will fail the PVO.key=TCE.key check and will be discarded by the adapter. However failing the PVO.key=TCE.key check also causes the adapter detecting the error to drive a window fatal error. If memory regions are common between adapters then the persistent subsystems are required to register them individually for all the adapters to prevent a MP_FATAL event on one adapter from impacting ongoing transfers on other adapters. The systems herein are optimized for the case where multiple adapter in the node share send and receive buffers so we have chosen not to implement this method for stale RDMA packet detection. Systems that are limited to supporting only one adapter, or where shared buffers are not needed should consider this solution.

3. Another solution is to add a key field to the rCxt ID: The rCxt_id in packet headers and the rCxt structure in adapter memory will be expanded by adding a key fields (rCxt_id.key and rCxt.key). The device driver will maintain a count of adapter recovery events for each adapter, and will use this count as the key for the rCxts when they are allocated. When stale RDMA packets show up at an adapter that has gone through an adapter recovery, they will be discarded because of the rCxt_id.key=rCxt.key check failure. The adapter will not drive a window error when a packet is discarded due to the rCxt_id.key check. This is important due to adapter recovery being fast relative to the in time needed to transfer a stream of RDMA packets. Our system implements rCxt key checking to guarantee detection of stale RDMA packets after adapter recovery events.

Node Global TCE Tables and Protocol Virtual Offset Addressing Method

Limited TCE table space available in kernel (or hypervisor) memory can limit the amount of memory that can be mapped for RDMA operations at any given time. The high cost of translating and mapping buffers accessed by more then one adapter and/or task can also limit node performance unnecessarily. There is thus a need for the system to ensure efficient memory protection mechanisms across jobs. A method is thus desired for addressing virtual memory on local and remote servers that is independent or the process ID on the local and/or remote node.

The use of node global TCE tables that are accessed/owned by RDMA jobs and managed by the device driver in conjunction with the Protocol Virtual Offset (PVO) address format solves these problems.

Each node is configured with one or more adapters that supports RDMA communications. All of the RDMA capable adapters are configured to access a shared set of TCE tables that reside in kernel (or hypervisor) memory space in the node. Each TCE table is used to map buffers backed by any one of the system supported page sizes. In a preferred embodiment of this invention page sizes of 4 KB, 64 KB, and 16 MB are supported when available from AIX (the UNIX based operating system supplied by the assignee of the present invention). The ownership/access to each TCE tables is granted by JOBID. The device driver is responsible for management of the TCE tables. In the presently preferred embodiment, the actual updates to the TCE tables in hypervisor memory are done through hypervisor services. When an RDMA job requests that a buffer be made available for communication the device driver updates TCEs for one of the tables assigned to that RDMA JOBID, and the buffer becomes addressable to all adapters on the node that are active for that RDMA JOBID.

The PVO format is used to encapsulate four pieces of information about a memory buffer that is prepared for RDMA communication: the index of the TCE table where real page address for the buffer are cached, the index into that TCE table, the interpage offset into the real page address (real page address is stored in the TCE) where the buffer starts, and a protection key used to detect programming errors and/or stale RDMA packets.

Current solutions have one or more TCE table for each adapter. If a buffer is accessed by more then one adapter, that buffer is mapped by TCE tables specific to each adapter. In current designs, buffer ownership is tracked by process id or by window id. In a node where a buffer is shared by more then one process (or window) that buffer must be mapped into TCEs owned by each process, causing duplicate entries in each of the adapter specific TCE tables. There are no know solutions which provide node global TCE tables in combination with process independent virtual addressing support for local and remote adapter accesses to RDMA buffers in user space systems memory.

In systems where multiple RDMA capable adapters are used, it is desirable to avoid translating and mapping any given buffer more then one time if possible. Node global TCE tables setup and managed by the device driver are shared by all of the RDMA adapters in the node. With node global TCE tables an RDMA buffer that is accessed by tasks running over more than one adapter needs only to be mapped one time. In addition the ownership of the TCE is moved from process id (or window id) scope to RDMA JOBID scope so that multiple processes in an RDMA job can avoid TCE entry duplication. Buffer addressing for RDMA operations use the Protocol Virtual Offset (PVO) addressing format. The PVO address format allows tasks in an RDMA job to exchange buffer addressing information between tasks on different servers. The PVO format also allows the protocols to add byte offsets to PVO's to access any byte in a RDMA buffer. For example, if the protocol has a valid PVO for a 32MB buffer it can manipulate the PVO (or a copy of the PVO) to address the data starting at PVO+2000 bytes. A protocol that makes a programming error when using an invalid PVO, or a valid PVO with an invalid transfer length is provided with a fatal error condition. One example of such an error is the use of a valid local PVO for a 4 KB memory region in an RDMA write operation with a transfer length of 16 KB, in this case the protocol that issued the invalid RDMA write operation would receive an asynchronous window fatal error. Note that addressing violations can only be detected when a page boundary is crossed because all memory access checks are page (and page size) biased.

The following steps are used by the adapter to validate the PVO in an incoming RDMA network packet and generate a real address:
1. Check that the JOBID in the incoming packet matches the JOBID of the target window for the RDMA packet. The packet is silently dropped if the JOBID is not a match.
2. The TCE table index is extracted from the PVO, and the JOBID that owns that table is compared with the JOBID in the RDMA packet. The packet is dropped if the JOBID is not a match.
3. The adapter extracts the index into the TCE table from the PVO and fetches the TCE from node kernel (or hypervisor) memory.
4. The adapter verifies that the key in the TCE (TCE.key) matches the key in the PVO (PVO.key). If the PVO.key and the TCE.key do not match or are invalid, the RDMA operation is dropped, and an address exception is generated. The address exception signals to the job that a fatal program error has been detected.
5. The adapter extracts the interpage offset from the PVO and adds it to the real address information from the TCE. The adapter can now continue with the RDMA operation as described earlier.

TABLE I

| PVO Format | | |
|---|---|---|
| Region Key | Table Index | Virtual Offset |
| 17 bits | 5 bits | 42 bits |

TABLE II

| TCE Format | |
|---|---|
| TCE Key | Real Addressing Bits |
| 22 bits | 42 bits |

Figure 15:
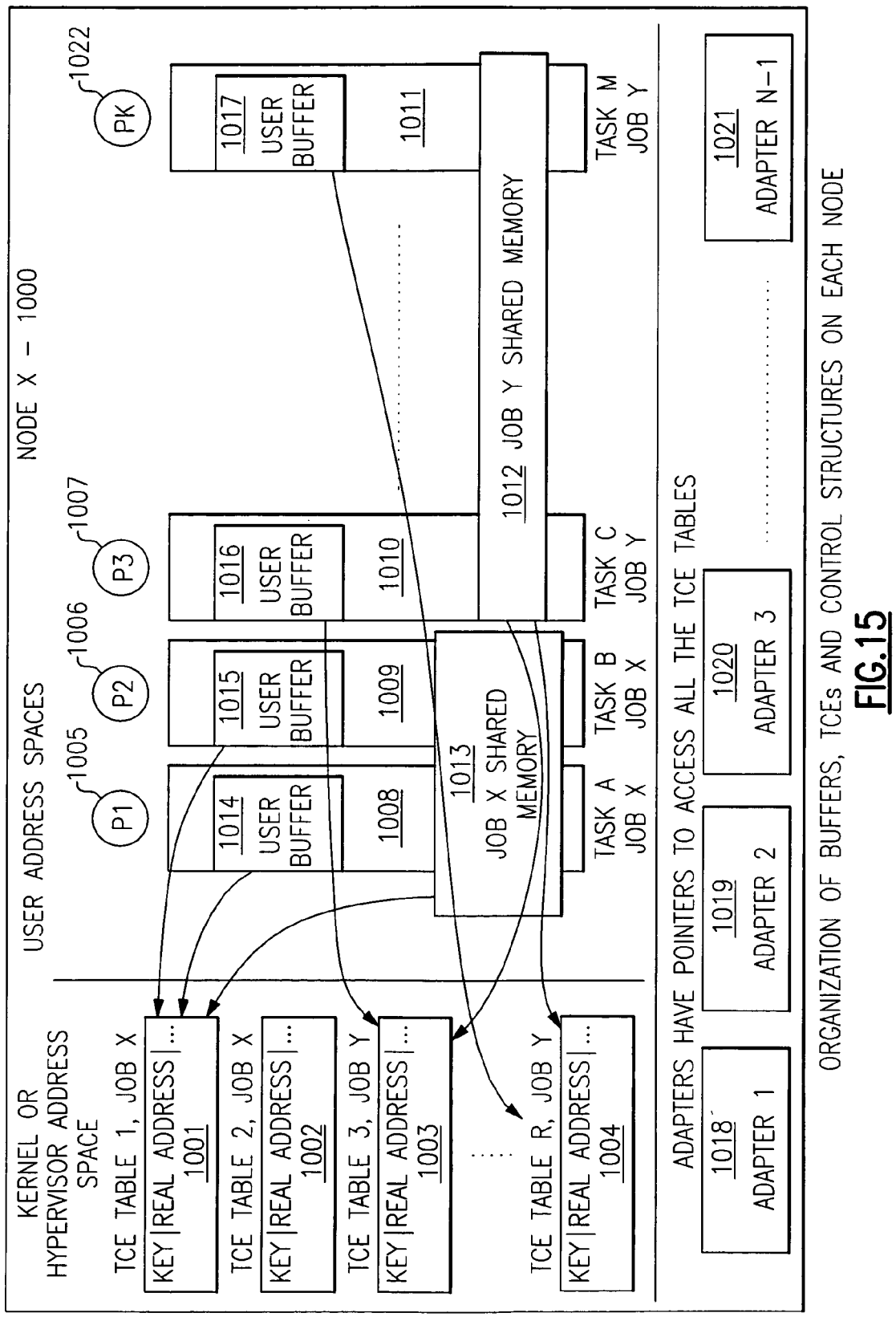
FIG. 15 is a block diagram illustrating the organization of Translation Control Entry (TCE) tables for RDMA and the protection domains on each node of a system.

FIG. 15 illustrates the organization of TCE tables for RDMA and the protection domains on each node of the system. Tasks of a parallel job X (for example, tasks 1008 and 1009) executing on Node X (reference numeral 1000) have individual user buffers 1014 and 1015 respectively and shared memory buffer 1013. Similarly, tasks (1010, 1011 . . . ) of parallel job Y have individual buffers 1016 and 1017, respectively and shared memory buffer 1012. TCE tables 1 and 2 (reference numerals 1001 and 1002) belong to Job X (reference numeral 1013). TCE Tables 3 through (reference numerals 1003 through 1004) belong to Job Y. All TCE table pointers are mapped to each of the available network interfaces on the node X (reference numeral 1000). The protection domains allow tasks of the same parallel job to share the TCE tables. Tasks of different parallel jobs are not allowed to share TCE tables so as to enable protection among multiple users of the system.

Figure 16:
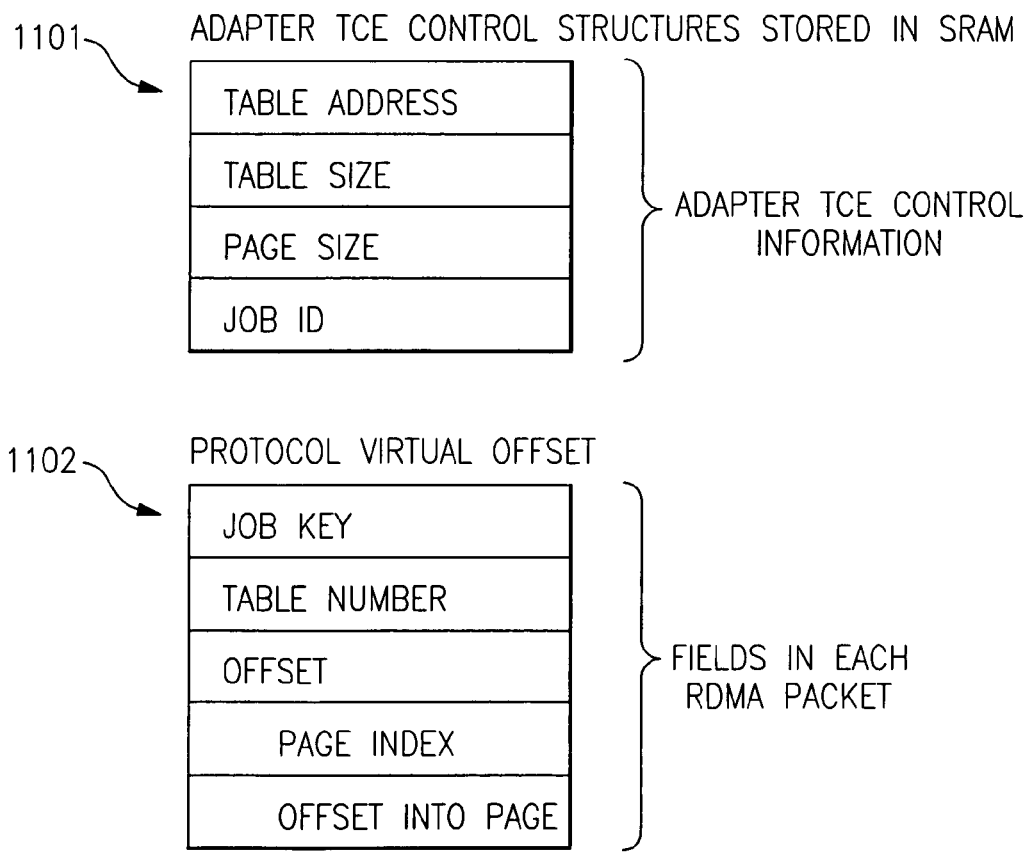
FIG. 16 is a block diagram illustrating key protections structures in the adapter and the important fields in each RDMA packet.

FIG. 16 illustrates the key protections structures on the adapter and the relevant fields in each RDMA packet which enables the receiving adapter to ensure that the incoming packets are only allowed to access memory regions allowed for that parallel job. The adapter stores for each TCE table (reference numeral 1101) some of the key fields necessary to enforce adequate protection when using RDMA operations. Examples of these fields are shown in FIG. 16. These fields include the table address, the size of the table, the page size that each entry in the table represents, and the job id that the TCE table belongs to. When the table is prepared in the kernel/hypervisor, these fields are appropriately initialized in the adapter memory. Each incoming packet has fields inserted by the sending side adapter to effect matching for protection enforcement. The job key matches the job id that is specified in the table number that the packet is referencing. Once the keys are found to be matching, Protocol Virtual Offset field 1102 is parsed to extract the page number in the TCE table being referenced and the appropriate offset within the page to which the payload contents of the RDMA packet are DMAed. The information which is thus produced by the parsing operation is found within the PVO structure offset field 1102. This field includes: the Job Key, the Table Number and the Offset. The Page Index (TCE table index) and the Offset into the Page (interpage offset) are calculated by the adapter from the PVO offset fields and the page size saves in the adapters TCE control structure.

Figure 17:
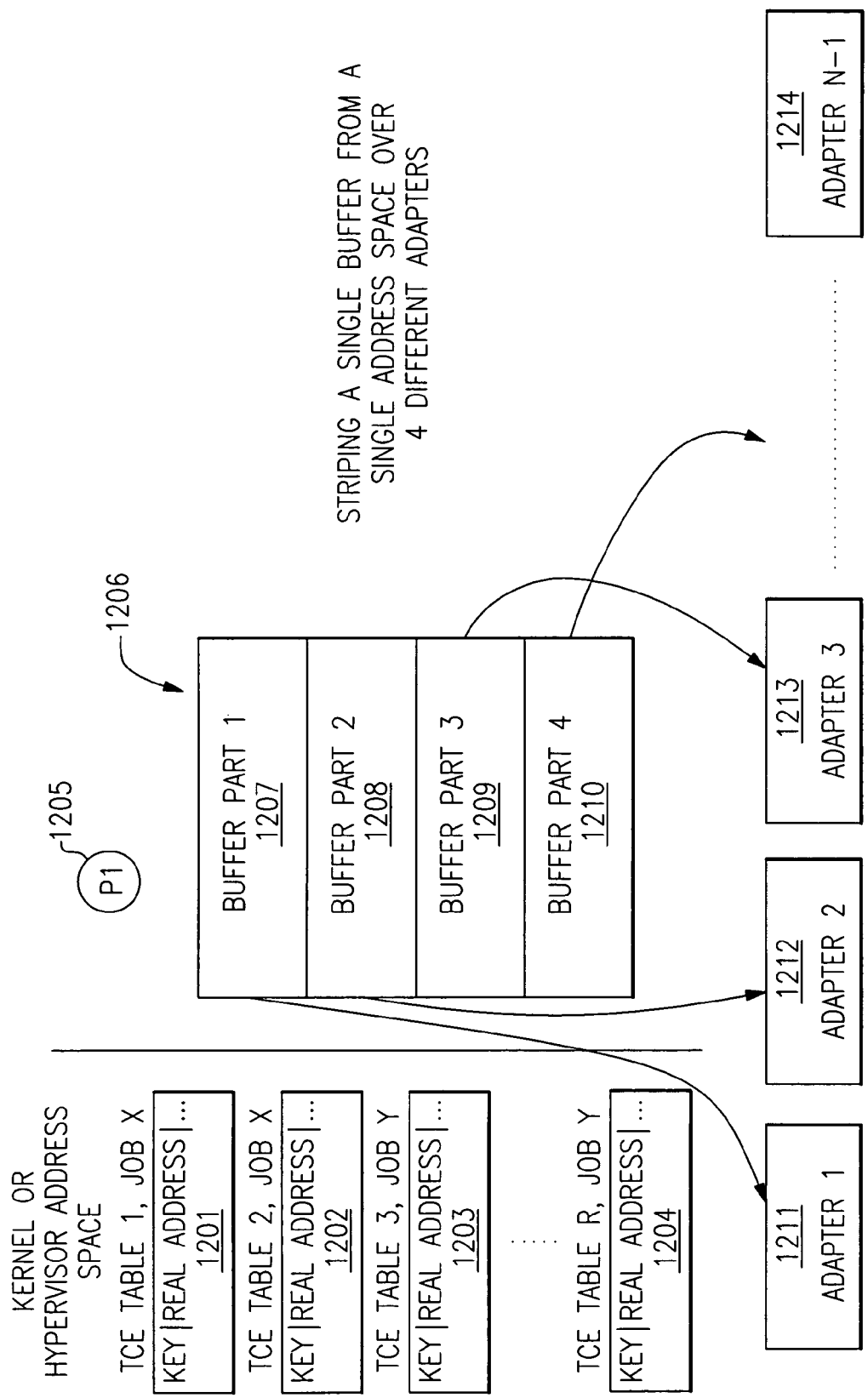
FIG. 17 is a block diagram illustrating how the setup of shared tables across multiple adapters on a node allows for simple striping models.

FIG. 17 illustrates how the setup of shared tables across multiple adapters on a node allows for simple striping models. Here it is assumed that task 1205 running on process PI needs to send a large buffer (reference numeral 1206) over the available network interfaces. Since the TCE tables for the job are shared by all of the adapters available on the network interface the ULP now has the ability to partition the large buffer into four smaller buffers (in this example, buffer parts 1, 2, 3 and 4 bearing reference numerals 1207 through 1210). The ULP can break this up into any number of smaller RDMA requests based on the number of adapters available, the size of the buffer, the cost of issuing RDMA requests and the synchronization overhead to coordinate the completion from multiple network interfaces. The ULP can then issue multiple RDMA requests in a pipelined fashion (buffer part 1207 over adapter 1211, buffer part 1208 over adapter 1212, buffer part 1209 over adapter 1213 and buffer part 1210 over adapter 1214, as shown). The ULP does not need to worry about which TCE tables should be used for the set of transfers. This allows for simple parallelization of large buffer transfers using RDMA over multiple network interfaces. It should be noted that it is not necessary that the buffer portions (1207-1210) be of the same size. Each of them can be of different lengths and can be partitioned based on the capabilities of the individual network adapters or any such similar parameter.

Figure 18:
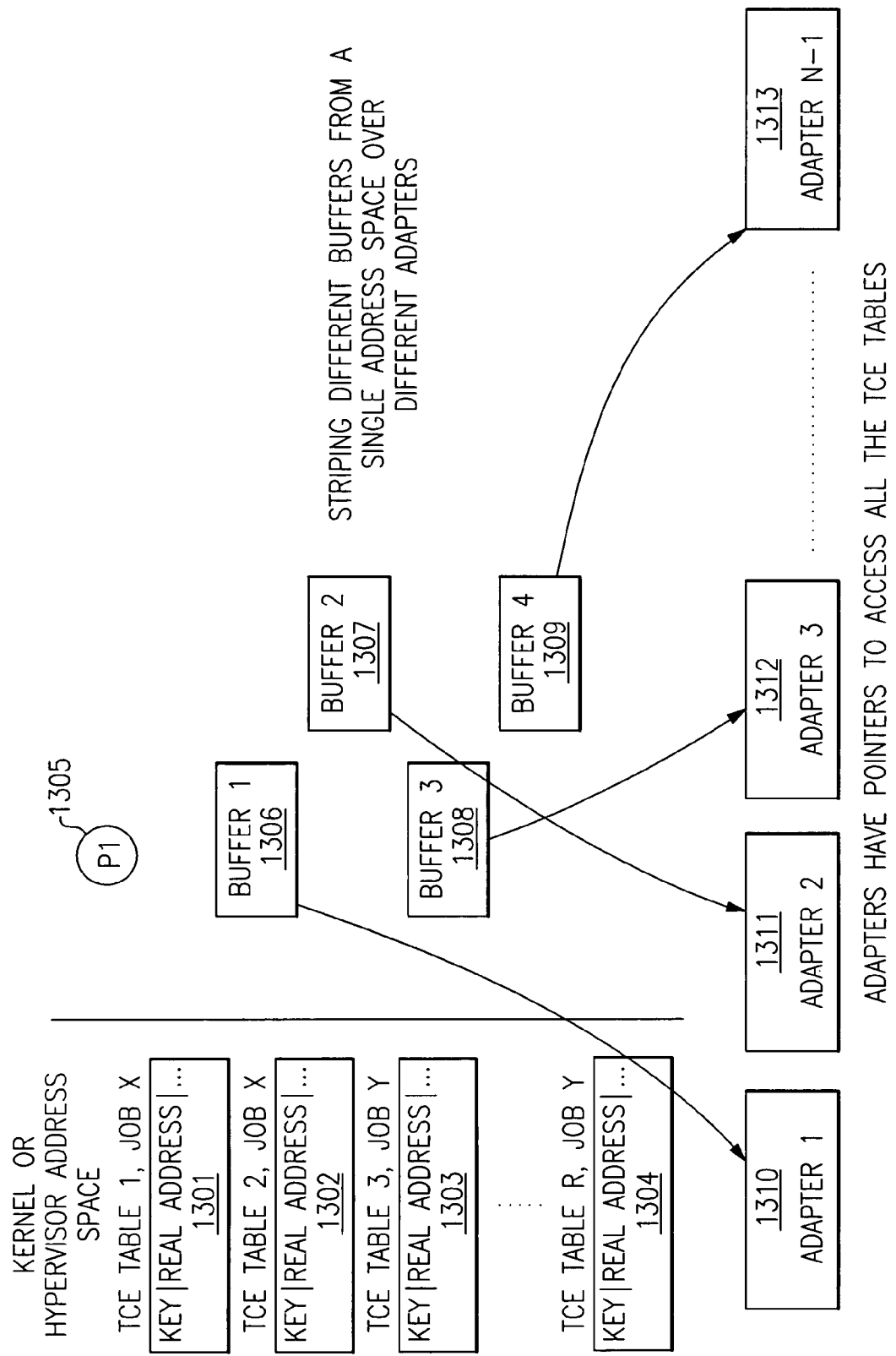
FIG. 18 is a block diagram illustrating how the shared translation setup per job enables a task in a parallel job.

FIG. 18 illustrates how the shared translation setup per job enables a task in a parallel job (reference numeral 1305) executing on Processor P1 uses the setup to efficiently pipeline the transfer of different buffers (reference numerals 1306 through 1309) over multiple network interfaces (reference numerals 1310 through 1313). The same model as the previous one applies and each buffer can be of varying length.

Some details of the presently preferred embodiment with respect to node global TCE tables and PVO addressing are now provided. Each adapter can access 32 TCE tables in hypervisor memory. The device driver sets up 20 TCE tables for use with 16 MB pages, and 10 tables for use with 4 KB pages when the first SMA/SMA+ adapter device driver configures. The tables are then allocated to five RDMA job slots structures with for 16 MB tables, and two 4 KB tables assigned to each slot. As the device driver for each adapter is configured each of the 30 TCE tables used are registered with the adapter, but the table JOBID ownership for each table is forced to an invalid setting. When the system's parallel job scheduler sets up a RDMA job it makes a request to the device driver for each of the adapters that tasks are scheduled on to reserve RDMA TCE resources, and assigns a RDMA JOBID. At this time the device driver assigns one of the five RDMA job slots (if one is available) to that JOBID, and updates the selected adapter(s) to reflect that a valid RDMA JOBID has ownership of the selected set of TCE tables. When a protocol registers a buffer for use in RDMA operations it makes a call into the device driver with the virtual address and length of its buffer. The driver makes any needed access checks, and if everything looks good the buffer is pinned, translated and mapped into one of the TCE tables assigned to the caller RDMA JOBID. The device driver selects the first available TCE entrees from a TCE table for the correct page size (with respect to the page size backing the callers buffer). The TCE table index, and the index of the first TCE for the callers buffer, the buffers interpage offset, and a key are used to calculate the buffers PVO. The 17 bit PVO.key and the 5 bit PVO.table are combined to form the 22 bit TCE.key. The device driver updates the TCE table in hypervisor memory and returns the PVO to the caller. Once all of the adapters are selected, the system's parallel job scheduler sets up the RDMA job which now has access to the caller's buffer for RDMA operations.

Interface Internet Protocol Fragmentation of Large Broadcast Packets in RDMA Environment In the latest adapter Internet protocol (IP) interface driver, the transmission of packets over a given size uses a remote DMA (RDMA) mechanism. This process utilizes a single destination in order to appropriately allocate memory and therefore is unavailable for broadcast traffic. In order to work around this problem, is the interface of the present invention uses its FIFO mode transmission for all broadcast traffic regardless of the size of the packet, which could be problematic for packets larger than the memory space assigned to each FIFO slot.

The interface protocol does a fragmentation of large broadcast packets and adjusts the AIX Internet protocol (IP) header information accordingly. This offloads the broadcast reassembly into the AIX IP layer, and allows the adapter IP interface to transmit broadcast traffic larger than the size of the FIFO slot.

In the interface layer there are two transmission pathways available. For small packets of any destination type, the interface assigns a FIFO slot to the packet, copies the data into that slot, and transmits packets. For packets with more data than can fit into the FIFO slot, the interface sets up a remote DMA of the data across the network. This process can accommodate only a single destination, however, and is inappropriate for traffic intended for broadcast or multicast addresses.

For a packet with multiple destinations and more data than can fit into a single FIFO slot, the adapter IP interface layer then segments the packet into sections which can fit into FIFO slots. The interface then assigns the packet the appropriate number of FIFO slots, and copies the data into those slots just as it would with a small packet transfer.

However, these individual packets cannot then be simply transmitted to the broadcast address as is. To most efficiently reassemble these broadcast packets upon receipt at the destination, the interface adjusts the data in the AIX IP layer's header. The fields altered are those which indicate that this packet is part of a larger message and then sets the offset into the larger packet so that it can be properly reassembled. By offloading the reassembly to the AIX IP layer, the interface efficiently minimizes the processing time required for the large broadcast packets in the receive flow. This then frees up processing time in the interface receive handler for other packets which then could otherwise impact the performance of that receive flow. The interface thus efficiently processes the large packets while ensuring that broadcast traffic is not restricted to messages of the interface's FIFO size.

Figure 20:
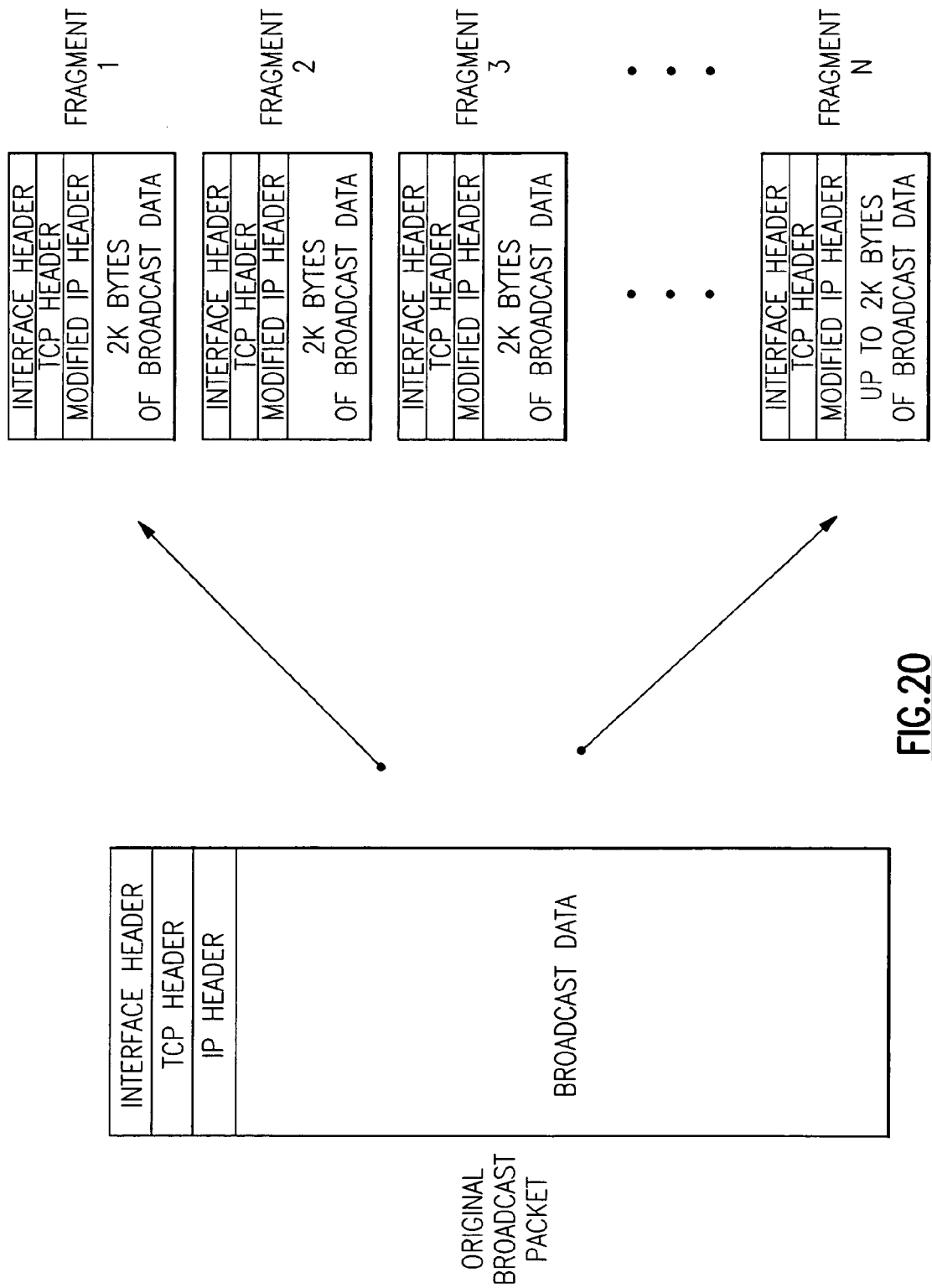
FIG. 20 is a block diagram illustrating the fragmentation of a large broadcast packet into smaller packets for transmission via the FIFO mode and in which the IP header is adjusted for reassembly upon receipt.

FIG. 20 is a block diagram illustrating the fragmentation of a large broadcast packet into smaller packets for transmission via the FIFO mode and in which the IP header is adjusted for reassembly upon receipt. FIG. 20 illustrates the broadcast packet as it is received on the send side of the interface driver. The packet has been processed first by the AIX IP layer and then by the AIX TCP layer and is then passed to the interface software. The raw broadcast data therefore has an appended IP header with the needed fields to handle that data by that layer in AIX and a subsequently appended TCP header. The adapter interface then appends its own interface header data, as it would for any packet. These three headers are then copied for each of the fragments into which the broadcast data is copied.

In order to arrange for AIX IP reassembly by the destination partitions, the interface then modifies the IP header data in order to ensure that the AIX IP layer processes the several fragmented packets accordingly. Thus, the diagram indicates that the IP header is in fact modified before transmission over the switch.

Figure 21:
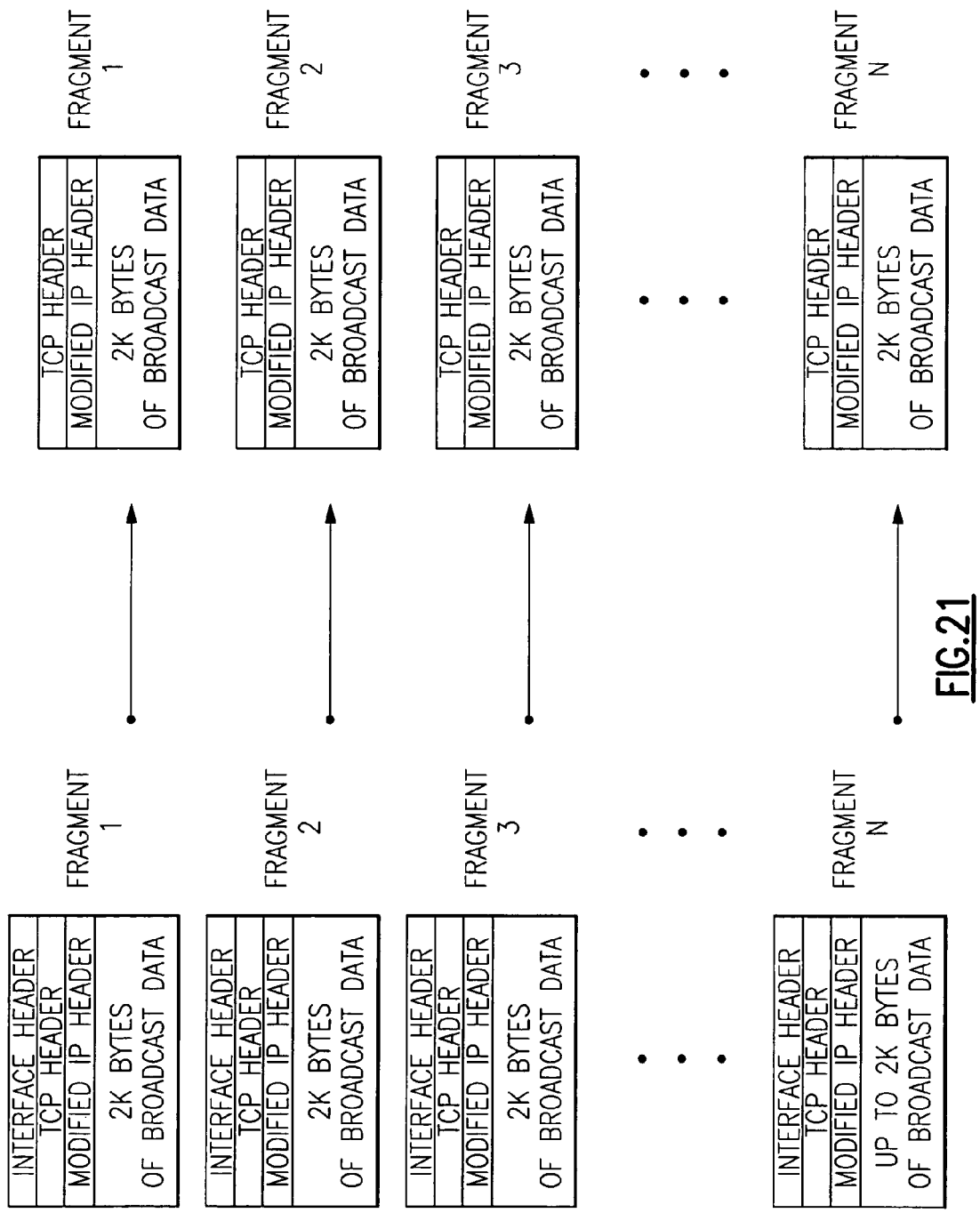
FIG. 21 illustrate receive side processing which removes the interface header and delivers smaller packets to the TCP Layer, where they are reassembled.
Figure 22:
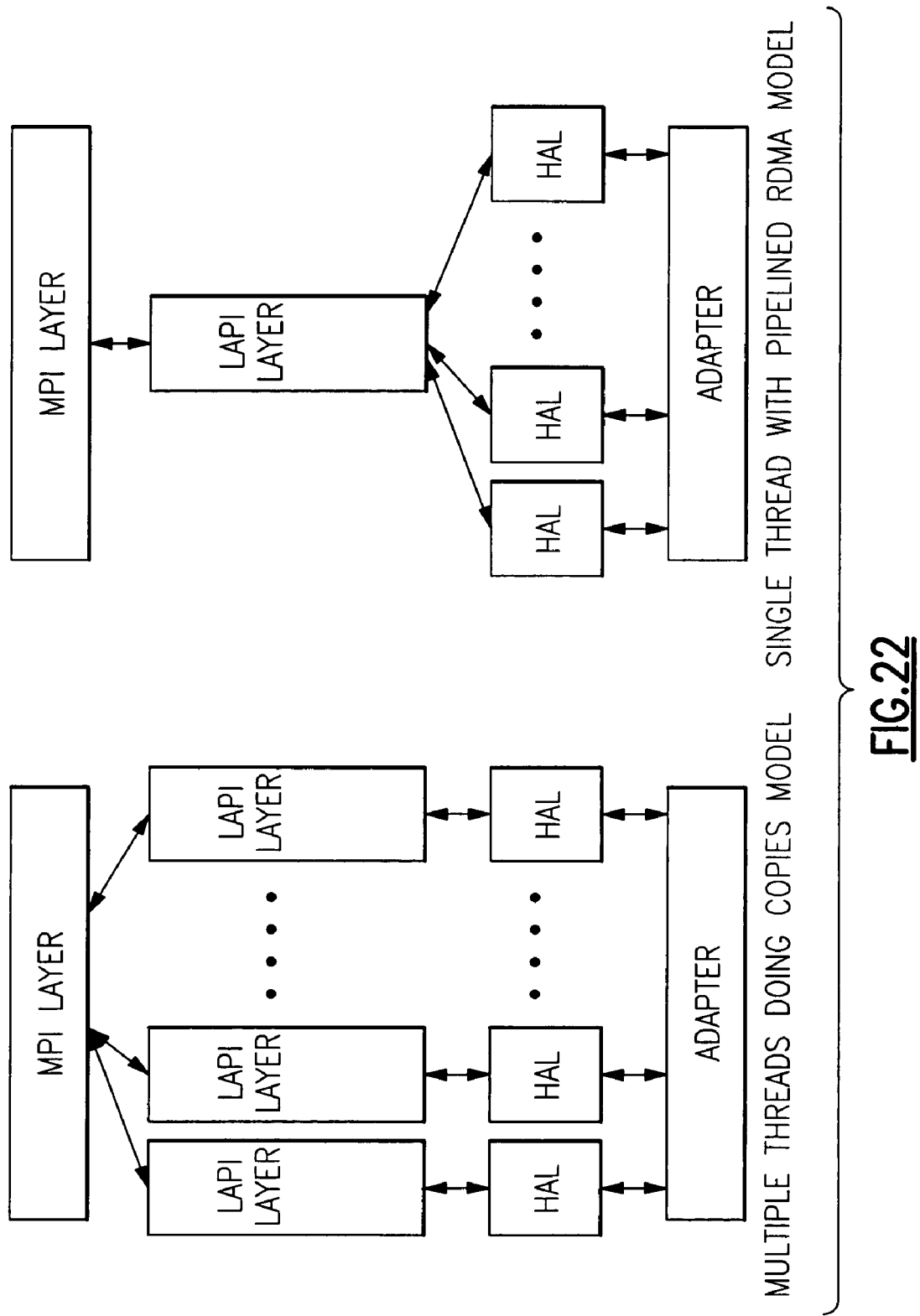
FIG. 22 illustrates the comparison between a process in which multiple threads are carrying out copy operations and a process in which a single thread is carrying out copy operations in a pipelined RDMA model.

FIG. 21 illustrate receive side processing which removes the interface header and delivers smaller packets to the TCP Layer, where they are reassembled. This figure illustrates the procedure followed by the adapter interface upon receiving these fragmented packets. The interface header is removed as per usual, and then the packets are treated as any other broadcast traffic would be, without regard to their fragmented nature. Thus, the AIX TCP header remains untouched as does the modified AIX IP header, which is then passed to the upper layer software to ensure correct reassembly.

There are two alternative ways of handling this situation, each with their own set of issues.

The first alternative is to have a similar implementation which fragments the IP packets, but instead of reassembling them in the IP layer, they are reassembled in the interface layer. The drawback to this approach is the added complexity for reassembling and the time-out capability that would need to be added in the interface layer to handle the IP fragments of large broadcast IP datagram.

The second alternative is to force the maximum transfer unit (MTU) to be 2,048 bytes (equal to or less than the switch fragment size). This would severely limit the performance of whole TCP/IP stack since the ULP would have to be invoked for every 2K byte chunk causing the per packet protocol processing to be much higher for larger transfers.

Thus, by manipulating the AIX IP header data for large broadcast packets to mimic a series of packets which has been segmented by the AIX IP layer itself, the adapter interface layer can ensure that the message is properly reassembled by the receiving adapters. This allows for broadcast messages of all sizes which use the FIFO mode of transfer and avoid conflicts with the RDMA mechanism commonly used for packets of that size.

Lazy Deregistration of User Virtual Machine to Adapter Protocol Virtual Offsets

In order to have the best performance for task to task data transfer, it is often useful to avoid copying data into and out of communication buffer, but rather have the data go directly into the user buffer from the communication hardware. This is the remote direct memory access (RDMA) capability implemented by IBM. However, there are a couple of problems with the use of RDMA which this invention intends to overcome. In order to use RDMA there must be some mapping between the Protocol Virtual Offset (PVO) for the pages and the real memory addresses were the data is stored. Currently, either the user is required to prepare any buffer before it is used with RDMA as is done with other interconnection vendors, or there must be hooks to into the Operating System (OS) so that the adapter can use the operating system's page tables to get the corresponding real addresses.

One of the core features of the present invention is to provide a mechanism to efficiently utilize the mapping between one or more task Protocol Virtual Offset (PVO) spaces and one of the Protocol Virtual Offset (PVO) spaces on the adapter that is described earlier. Here, the user's address space is fragmented into fixed size chunks or fragments, which are unrelated to the VM (Virtual Memory) page size. When an RDMA operation is attempted, the virtual memory address space range is checked to determine if it has already been mapped to an adapter's Protocol Virtual Offset (PVO) space. If it has already been mapped, then it reuses the previously obtained adapter virtual addresses to affect the data transfer using RDMA. If the check shows that the address range is not mapped then the protocol maps one or more of the fragments of the user's Protocol Virtual Offset (PVO) space to the adapter's Protocol Virtual Offset (PVO) space and use those adapter virtual addresses for the data transfer. These new mappings are then saved so that any subsequent transfers within the same chunk of virtual memory are accomplished with no additional setup overhead.

This mechanism provides advantages over other ways of solving this problem. When used for a two sided protocol, its use is completely transparent to the user. This means that application programs require no changes in order to enjoy the performance benefits of the smart reuse of the setup for RDMA across multiple RDMA transactions from/to the same user buffers. The use of this invention permits very modular programing since there is no coupling of the operating system page tables and the user virtual memory. Finally this permits a server application to maintain separate mappings for multiple tasks and to affect data transfer on their behalf. This is very useful in a kernel context, but it can also be used by a root client.

Much of the overhead associated with RDMA transfer path is the setup cost of pinning and mapping the user buffers. Since the present "lazy" deregistration model for RDMA supports persistent data translations and mappings, this overhead cost can be eliminated for most large transfers. Consider first the case of a 32 bit address space. The address space consists of 256 fragments of 16 Megabytes each. This fragmentation is by way of example only to illustrate the concepts that are embodied in the present invention. It should be noted though that this design does not require any specific fragment size. However, for the sake of simplicity, to explain the relevant concepts herein, a fragment size of 16 MB is used to explain the invention. The allocation is therefore done in a 16 MB fragment size.

First a bit vector is created to keep track of mapped fragments. See FIG. 11 which is limited for explanatory purposes to showing only the mappings between the virtual address space of a single task and the adapter PVOs. Each bit corresponds to a single 16 Megabyte fragment. This bit vector must be 8 unsigned integers in length (which is 256 [fragments in address space]/32 [bits in integer]. If a bit in this bit vector is set, then there already exists a mapping between the task Protocol Virtual Offset (PVO) space and the adapter Protocol Virtual Offset (PVO) space.

The ULP library first checks if the 16 Megabyte fragment is mapped. If it is mapped, an auxiliary array, indexed by the bit number in the bit vector described above holds a pointer to a structure which has the PVOs. If it is not mapped, then the mapping is done and the map bit is set. If the Protocol Virtual Offset (PVO) is mapped, the protocol verifies that the mapped region corresponds to the existing virtual memory. If it does not, then the memory region is unmapped and remapped. This is necessary, under the following scenario. A user attaches a shared memory segment to some region of the address space. This buffer is used for communication for a while. Later this shared memory segment is detached from the user address space and a different shared memory segment is attached to the same Protocol Virtual Offset (PVO). Each time the fragment is referenced, the idle_count is set to zero. The idle_count is incremented once per second based on timer ticks. If the idle count reaches some tunable amount, the segment is unmapped, if not in use. The use_count is incremented each time the address is used in a bulk transfer and is decremented when the RDMA operation has completed. This simple mechanism allows for a LRU (least recently used) policy of reclaiming mapped regions. At the ULP level a message may be delivered more than once. In this respect it is also noted that there is no message delivered after notification.

Figure 11:
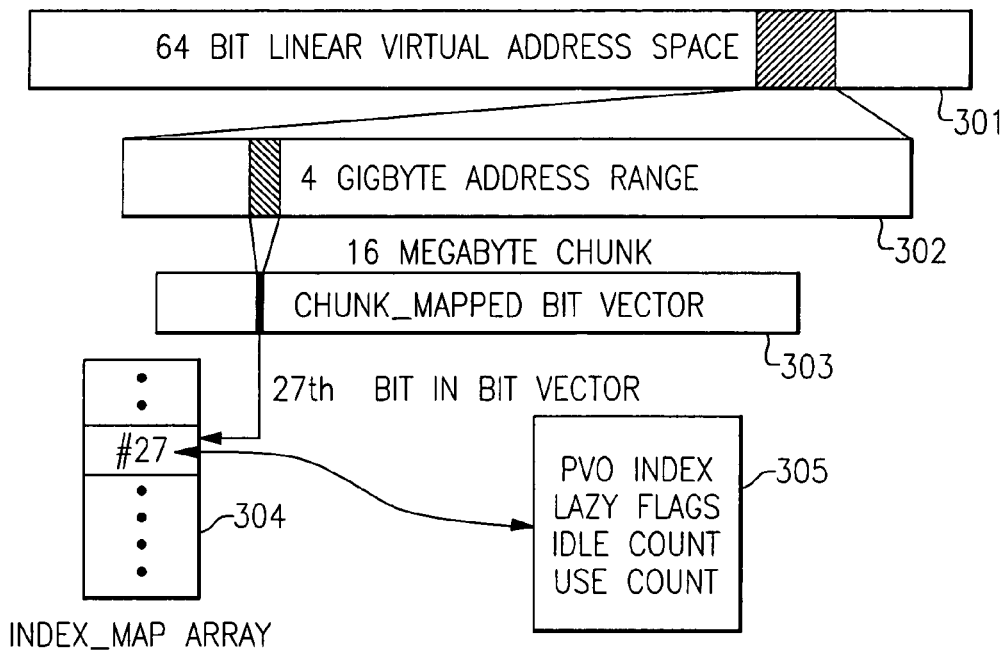
FIG. 11 is s a block diagram illustrating address mapping used for RDMA operations in the present invention.

For 64 bit address spaces, the address space is segmented into 4 GB segments and a hash table is created for the bit mappings described above. This is shown in FIG. 11.

This invention effectively allows fast and transparent access to the user memory from the communication hardware. The adapter mapping may be discarded either when the application ends or when the idle count is too large or when a mapping fails.

BRIEF GLOSSARY OF TERMS

BMR—"Buffer Manager Response Register": Contains information about a channel buffer (in particular the count of send and receive tasks bound to the adapter window).
CB—"Channel Buffer": A CB is cache for a LMT. A CB contains two pieces (each 256 bytes in length) called CB0 and CB1. The present adapter has 16 CBs, exactly as many as it (potentially) has tasks. Several tasks may be acting on behalf of a single adapter window; in that case those threads all share the same CB. The CBs are essentially microcode managed caches; in particular the microcode is responsible for flushing CBs to adapter SRAM.
CTR—"Current Task Register": Identifies currently active task (0 . . . 15).
DM—"Data Mover": Adapter DMA engine for accessing system memory and adapter SRAM.
DTB—"Data Transfer Buffer": An adapter buffer for holding packet payloads. The present adapter has 8 DTBs.
GR—"Global register": A register accessible to all adapter tasks.
LMT—"Local Mapping Table": A data structure associated with, and governing the operation of, a adapter window. The data structure is provided in adapter SRAM. A small part of the data structure is "understood" by the device driver; most of the structure is for the private use of adapter microcode. An LMT entry may be cached in an adapter CB.
PM—"Packet Mover": DMA engine for transmitting and receiving packets.
PVO—"Protocol Virtual Offset": A data structure used to define portable address mappings between adapters for RDMA.
TR—"Task register": A task-private register.
ULP—Upper Layer protocol which in the presently preferred embodiment includes HAL (Hardware Abstraction Layer), LAPI (Low Level Application Programming Interface), and MPI (Message Passing Interface).

As will appreciated by one of ordinary skill in the art, the above-described processing can be implemented as a computer program product comprising a tangible storage medium readable by a processor and storing instructions for execution by the processor for performing one or more aspects of the invention described above.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for performing a write operation from a source node to a destination node, said method comprising:
transferring write data via a remote direct memory access mode of operation from said source node to a first communications adapter, coupled to said source node;
transferring said write data via a network from said first communications adapter to a second communications adapter coupled to said destination node; and
transferring said write data into a memory queue in said destination node wherein said write data is subject to subsequent scattering from the memory queue to specific target memory locations within said destination node pursuant to a first-in, first-out mode of operation, under program control in said destination node.

2. The method of claim 1 further including providing notification via a completion packet sent to said source node.

3. The method of claim 2 further including generating an early interrupt to be handled by said program control.

4. The method of claim 3 in which said generating is controllably selectable by said program control.

5. The method of claim 1 in which said write data is transferred in packets that do not arrive in the same order in which they are sent.

6. A method for performing a write operation from a source node to a destination node, said method comprising:
transferring write data into a memory queue in said source node wherein said write data is subject to subsequent transfer from the memory queue to a first communications adapter coupled to said source node pursuant to a first-in, first-out mode of operation, under program control in said source node;
transferring said write data via a network from said first communications adapter to a second communications adapter coupled to said destination node; and
transferring said write data, via a remote direct memory access mode of operation, from said second communications adapter to specific target memory locations within said destination node.

7. The method of claim 6 further including providing notification via a completion packet sent to said source node.

8. The method of claim 6 in which said data is transferred in packets that do not arrive in the same order in which they are sent.

9. A method for performing a read operation initiated by a destination node for data residing on a source node, said method comprising:
transferring said data via a remote direct memory access mode of operation from said source node to a first communications adapter, coupled to said source node;
transferring said data via a network from said first communications adapter to a second communications adapter coupled to said destination node; and
transferring said data into a memory queue in said destination node wherein said data is subject to subsequent scattering from the memory queue to specific target memory locations within said destination node pursuant to a first-in, first-out mode of operation, under program control in said destination node.

10. The method of claim 9 in which said transferring operations are initiated by a read request from said destination node.

11. The method of claim 9 further including providing notification via a completion packet sent to said source node.

12. The method of claim 9 in which said data is transferred in packets that do not arrive in the same order in which they are sent.

13. The method of claim 9 further including providing notification via a completion packet sent to said destination node.

14. A method for performing a read operation initiated by a destination node for data residing on a source node, said method comprising:
transferring said data into a memory queue in said source node wherein said data is subject to subsequent transfer from the memory queue to a first communications adapter coupled to said source node pursuant to a first-in, first-out mode of operation, under program control in said source node;
transferring said data via a network from said first communications adapter to a second communications adapter coupled to said destination node; and
transferring said data, via a remote direct memory access mode of operation, from said second communications adapter to specific target memory locations within said destination node.

15. The method of claim 14 in which said transferring operations are initiated by a read request from said destination node.

16. A computer program product for performing a write operation from a source node to a destination node, the computer program product comprising:
a non-transitory storage medium readable by a processor and storing instructions for execution by the processor for:
transferring said write data via a remote direct memory access mode of operation from said source node to a first communications adapter coupled to said source node; transferring said write data via a network from said first communications adapter to a second communications adapter coupled to said destination node; and
transferring said write data into a memory queue in said destination node wherein said write data is subject to subsequent scattering from the memory queue to specific target memory locations within said destination node pursuant to a first-in, first-out mode of operation, under program control in said destination node.

17. A computer program product for performing a read operation initiated by a destination node for data residing on a source node, the computer program product comprising:
a non-transitory storage medium readable by a processor and storing instructions for execution by the processor for:
transferring said data via remote direct memory access mode of operation from said source node to a first communications adapter, coupled to said source node; transferring said data via a network from said first communications adapter to a second communications adapter coupled to said destination node; and
transferring said data into a memory queue in said destination node wherein said data is subject to subsequent scattering from the memory queue to specific target memory locations within said destination node pursuant to a first-in, first-out mode of operation, under program control in said destination node.

18. A computer program product for performing a write operation from a source node to a destination node, the computer program product comprising:
a non-transitory storage medium readable by a processor and storing instructions for execution by the processor for:
transferring said write data into a memory queue in said source node wherein said write data is subject to subsequent transfer from the memory queue to a first communications adapter coupled to said source node pursuant to a first-in, first-out mode of operation, under program control in said source node;
transferring said write data via a network from said first communications adapter to a second communications adapter coupled to said destination node; and
transferring said write data, via a remote direct memory access mode of operation, from said second communications adapter to specific target memory locations within said destination node.

19. A computer program product for performing a read operation initiated by a destination node for data residing on a source node, the computer program product comprising:
a non-transitory storage medium readable by a processor and storing instructions for execution by the processor for:
transferring said data into a memory queue in said source node wherein said data is subject to subsequent transfer from the memory queue to a first communications adapter coupled to said source node pursuant to a first-in, first-out mode of operation, under program control in said source node;
transferring said data via a network from said first communications adapter to a second communications adapter coupled to said destination node; and
transferring said data, via a remote direct memory access mode of operation, from said second communications adapter to specific target memory locations within said destination node.

20. A multinode data processing system having a memory containing program instructions therein for performing a write operation from a source node to a destination node, via a method comprising:
transferring said write data via a remote direct memory access mode of operation from said source node to a first communications adapter coupled to said source node;
transferring said write data via a network from said first communications adapter to a second communications adapter coupled to said destination node; and
transferring said write data into a memory queue in said destination node wherein said write data is subject to subsequent scattering from the memory queue to specific target memory locations within said destination node pursuant to a first-in, first-out mode of operation, under program control in said destination node.

21. A multinode data processing system having a memory containing program instructions therein for performing a read operation initiated by a destination node for data residing on a source node, via a method comprising:
transferring said write data via a remote direct memory access mode of operation from said source node to a first communications adapter, coupled to said source node;
transferring said data via a network from said first communications adapter to a second communications adapter coupled to said destination node; and
transferring said write data into a memory queue in said destination node wherein said data is subject to subsequent scattering from the memory queue to specific target memory locations within said destination node pursuant to a first-in, first-out mode of operation, under program control in said destination node.

22. A multinode data processing system having a memory containing program instructions therein for performing a write operation from a source node to a destination node, via a method comprising:
transferring said write data into a memory queue in said source node wherein said write data is subject to subsequent transfer from the memory queue to a first communications adapter coupled to said source node pursuant to a first-in, first-out mode of operation under program control in said source node;

transferring said write data via a network from said first communications adapter to a second communications adapter coupled to said destination node; and transferring said write data, via a remote direct memory access mode of operation, from said destination communications adapter to specific target memory locations within said destination node.

23. A multinode data processing system having a memory containing program instructions therein for performing a read operation initiated by a destination node for data residing on a source node, via a method comprising:

transferring said data into a memory queue in said source node wherein said data is subject to subsequent transfer from the memory queue to a first communications adapter coupled to said source node pursuant to a first-in, first-out mode of operation, under program control in said source node;

transferring said data via a network from said first communications adapter to a second communications adapter coupled to said destination node; and transferring said data, via a remote direct memory access mode of operation, from said second communications adapter to specific target memory locations within said destination node.

* * * * *